US010048454B2

(12) United States Patent
Fiebig et al.

(10) Patent No.: US 10,048,454 B2
(45) Date of Patent: Aug. 14, 2018

(54) FIBER COUPLING DEVICE FOR COUPLING OF AT LEAST ONE OPTICAL FIBER

(71) Applicant: CCS Technology, Inc., Wilmington (DE)

(72) Inventors: Christian Fiebig, Berlin (DE); Chenueh Abongwa Florian Lohse, Berlin (DE)

(73) Assignee: Corning Optical Communications LLC, Hickory, NC (US)

( * ) Notice: Subject to any disclaimer, the term of this patent is extended or adjusted under 35 U.S.C. 154(b) by 0 days.

(21) Appl. No.: 15/239,986

(22) Filed: Aug. 18, 2016

(65) Prior Publication Data

US 2017/0068057 A1 Mar. 9, 2017

Related U.S. Application Data

(63) Continuation of application No. PCT/US2015/048489, filed on Sep. 4, 2015.

(51) Int. Cl.
*G02B 6/36* (2006.01)
*G02B 6/42* (2006.01)
(Continued)

(52) U.S. Cl.
CPC ............. *G02B 6/4228* (2013.01); *G02B 6/32* (2013.01); *G02B 6/4214* (2013.01);
(Continued)

(58) Field of Classification Search
CPC ........ G02B 6/32; G02B 6/425; G02B 6/4206; G02B 6/4214; G02B 6/4228; G02B 6/4257
(Continued)

(56) References Cited

U.S. PATENT DOCUMENTS 4,130,343 A 12/1978 Miller et al.
4,304,461 A * 12/1981 Stewart .................... G02B 6/32
385/74

(Continued)

FOREIGN PATENT DOCUMENTS

EP 0562211 A1 9/1993
EP 0682956 A2 11/1995

(Continued)

OTHER PUBLICATIONS

Guan, Lim Teck, et al., "Integrated Optical Carrier for Optical/Electrical Interconnect," IEEE Transactions on Components, Packaging, and Manufacturing Technology, vol. 1, No. 1, Jan. 2011, pp. 125-132.

(Continued)

*Primary Examiner* — Robert Tavlykaev
(74) *Attorney, Agent, or Firm* — Michael E. Carroll, Jr.

(57) ABSTRACT

A fiber coupling device for coupling of at least one optical fiber is disclosed. The fiber coupling device comprises at least one opto-electronic and/or photonic chip comprising at least one opto-electronic and/or photonic integrated element capable of emitting and/or detecting electromagnetic radiation. The fiber coupling device is configured for coupling the at least one opto-electronic and/or photonic integrated element to at least one fiber end-piece of an optical fiber having a reflection surface and a convex exit and/or entrance surface. The fiber coupling device further comprises a fiber end-piece alignment substrate configured for locally contacting and thereby supporting at least one convex exit and/or entrance surface of at least one fiber end-piece in an aligned position relative to the at least one opto-electronic and/or photonic integrated element.

36 Claims, 19 Drawing Sheets

(51) Int. Cl.
*G02B 6/32* (2006.01)
*G02B 6/26* (2006.01)

(52) U.S. Cl.
CPC ............ *G02B 6/4257* (2013.01); *G02B 6/262* (2013.01); *G02B 6/4203* (2013.01); *G02B 6/423* (2013.01); *G02B 6/425* (2013.01); *G02B 6/4206* (2013.01)

(58) Field of Classification Search
USPC ................ 385/31, 33, 35, 36, 49, 88, 89, 92
See application file for complete search history.

(56) References Cited

U.S. PATENT DOCUMENTS 4,732,446 A 3/1988 Gipson et al.
5,195,150 A * 3/1993 Stegmueller ......... G02B 6/1245 385/33
5,247,597 A * 9/1993 Blacha ................. G02B 6/4202 385/39
5,940,564 A * 8/1999 Jewell ................. G02B 6/4204 385/35
6,115,521 A * 9/2000 Tran .................... G02B 6/4214 385/33
6,328,484 B1 12/2001 Uebbing
6,501,878 B2 * 12/2002 Hughes ................ G02B 6/4214 385/35
6,655,850 B2 * 12/2003 Mann ...................... G02B 6/32 385/33
6,810,160 B2 * 10/2004 Sugama ............. G02B 6/12002 385/129
6,904,197 B2 * 6/2005 Bhagavatula ........ G02B 6/2552 385/31
7,039,275 B2 * 5/2006 Williamson ........... G02B 6/262 385/33
7,389,013 B2 * 6/2008 Fang .................... G02B 6/4204 385/14
7,720,332 B2 * 5/2010 Park ....................... G02B 6/241 216/26
8,755,644 B2 6/2014 Budd et al.
8,979,394 B2 3/2015 Ertel
9,151,917 B2 * 10/2015 Lee ...................... G02B 6/4206
9,566,752 B2 * 2/2017 Hartkorn .......... B29D 11/00692
2001/0004413 A1 6/2001 Aihara
2002/0067886 A1 * 6/2002 Schaub .............. G02B 6/29365 385/33
2002/0131727 A1 * 9/2002 Reedy .................. G02B 6/4214 385/88
2003/0012545 A1 * 1/2003 Bellman .............. G02B 6/2552 385/140
2003/0147600 A1 8/2003 Wickman et al.
2004/0017977 A1 1/2004 Lam et al.
2006/0067620 A1 * 3/2006 Shishkov ............. A61B 5/0066 385/38
2006/0110110 A1 5/2006 Yi et al.
2009/0190883 A1 * 7/2009 Kato .................... A61B 5/0066 385/33
2011/0064358 A1 3/2011 Nishimura
2011/0075976 A1 3/2011 Sutherland
2012/0099820 A1 4/2012 Rolston et al.

FOREIGN PATENT DOCUMENTS

EP 2713193 A1 4/2014
JP 59046616 A 3/1984
JP 64042611 A 2/1989
JP 02064509 A 3/1990
JP 09090177 A 4/1997
JP 2004212847 A 7/2004
JP 2006126754 A 5/2006
JP 2007121973 A 5/2006

OTHER PUBLICATIONS

Patent Cooperation Treaty, International Search Report and Written Opinion for PCT/US15/048489, dated May 10, 2016, 14 pages.

* cited by examiner

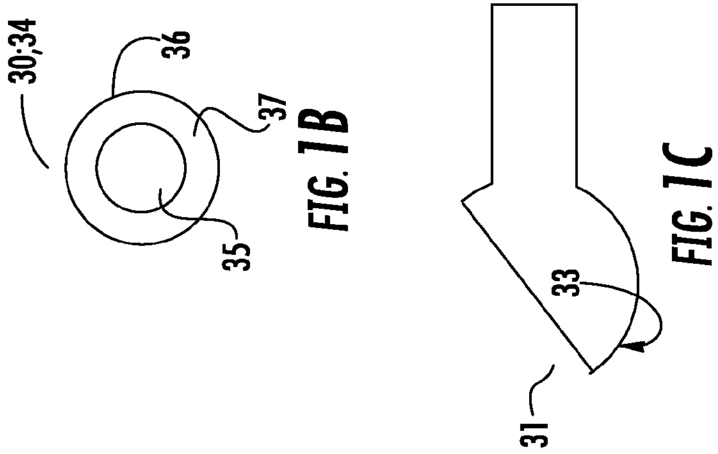
FIG. 1B
FIG. 1C
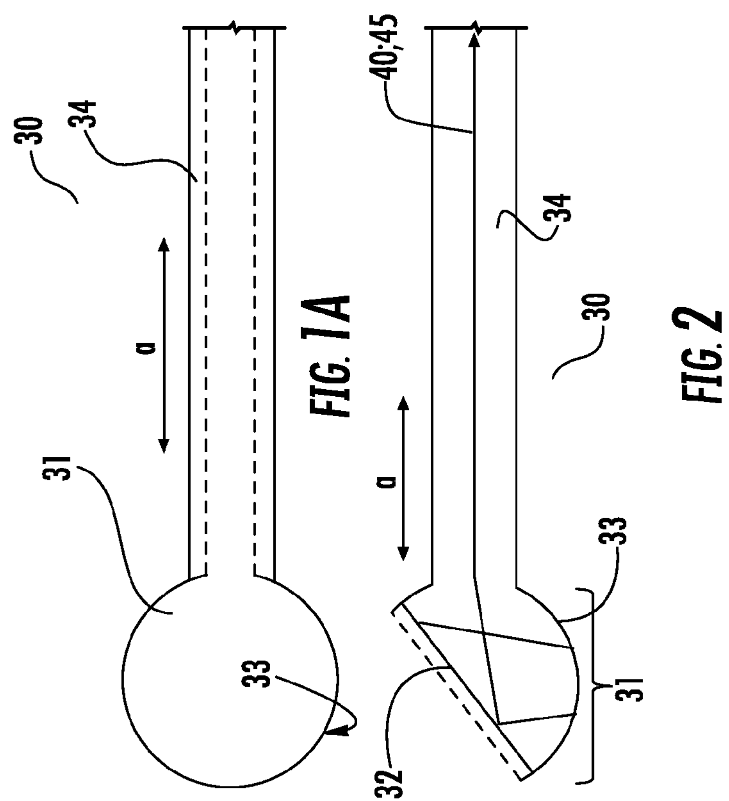
FIG. 1A
FIG. 2

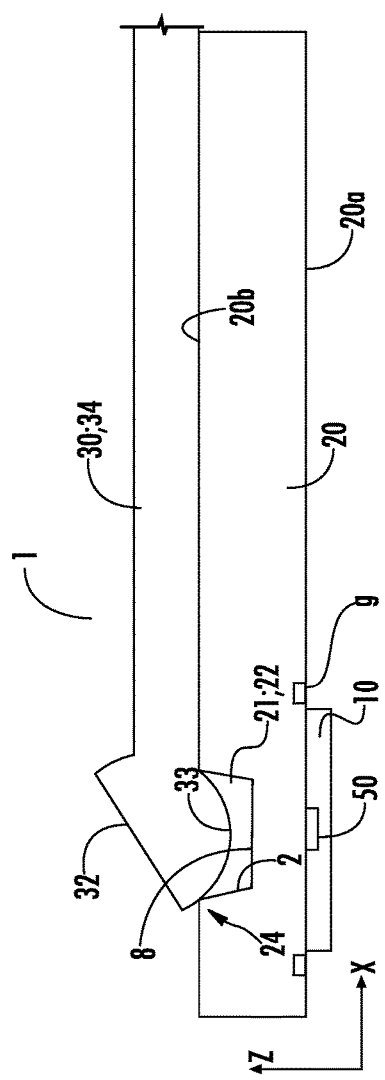
FIG. 7A
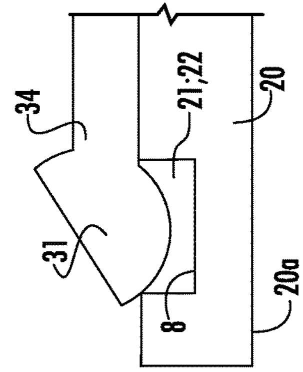
FIG. 7C
FIG. 7B

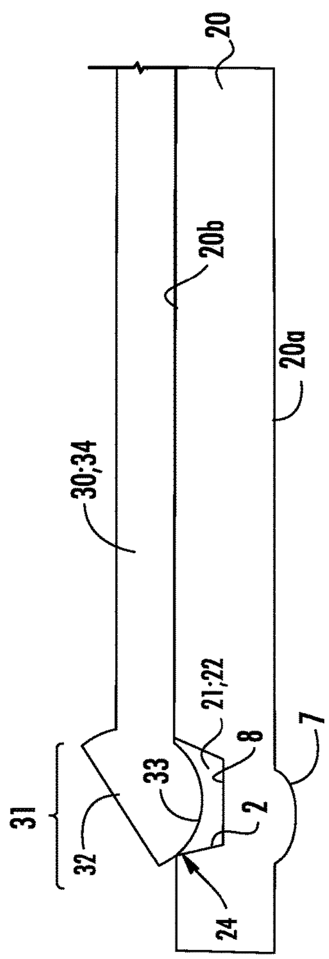
FIG. 10A
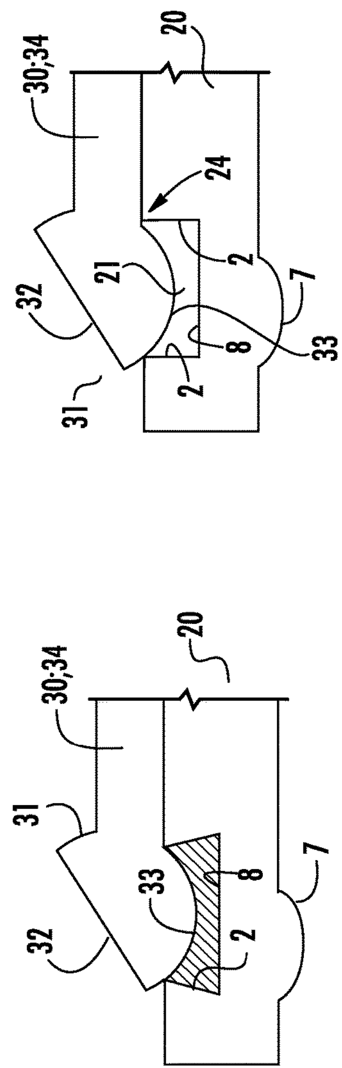
FIG. 10C
FIG. 10B

FIBER COUPLING DEVICE FOR COUPLING OF AT LEAST ONE OPTICAL FIBER

CROSS-REFERENCE TO RELATED APPLICATIONS

This application claims the benefit of priority to International Application No. PCT/US15/048489, filed on Sep. 4, 2015, and is incorporated herein by reference.

FIELD

A fiber coupling device for coupling of at least one optical fiber is disclosed.

BACKGROUND

In the field of optical fibers to be coupled to opto-electronic and/or photonic integrated elements, properly aligning a fiber end piece to a respective integrated element, such as a photo diode, a VCSEL or another opto-electronic active element, or to a photonic element comprising a photonic integrated circuit impacts optical performance. In a fiber coupling device comprising at least one opto-electronic and/or photonic chip, the optical connection between the opto-electronic and/or photonic element, i.e. the integrated element, and the fiber end piece must be realized in a perfectly aligned manner for enabling optimum coupling efficiency with maximum intensity of radiation being transmissible between the optical fiber and the light-detecting or light-emitting element. Any positional offset or mismatch between the integrated element and the end piece of the optical fiber will decrease coupling efficiency and will deteriorate signal transmission. These issues are even more concern for signal transmission with data rates of about 20 GB/s or beyond, high-speed signal transmission thus requires precise alignment of fiber end pieces.

In order to ensure maximum signal integrity, there are techniques for active alignment which involve the measurement of the transmitted signal intensity during mounting of the fiber end piece to the integrated element. More efficient techniques use self-alignment between the fiber end piece and the integrated element. For these techniques, optical fibers are used which are cleaved and polished at the respective fiber end so as to have a planar, flat exit and/or entrance surface essentially perpendicular to the axial direction of the fiber along which light propagation occurs. Such fiber end-pieces are, for example, glued to respective support structures on the opto-electronic chip which support structures may comprise mirrors for deflecting the direction of propagation by 90°.

SUMMARY

The disclosure of the present application refers to the coupling of optical fibers whose fiber end-pieces have another geometry, i.e. to fiber end-pieces which are thicker than the uniformly shaped, elongate fiber portion and which comprise a so-called ball lens or, more precisely, a semi-ball lens. Fiber end-pieces shaped in this way are formed by temporal heating of the fiber end-piece so as to form a ball lens, that is a ball, drop or other kind of aggregation of fiber material which is roughly spherical in shape and has a diameter or cross-section being larger than the diameter of the cylindrical, elongate fiber portion. A surface portion of such a thickened fiber end-piece finally used as a lens surface for focusing or collimating a beam of radiation passing it, in a direction substantially perpendicular to the fiber axis of the elongate fiber portion. These thickened fiber end-pieces are then cleaved and polished so as to obtain another, planar or only slightly curved surface being inclined by about 45° or another angle relative to the axial direction. Such an inclined surface serves as a reflection surface for deflecting the direction of propagation of radiation inside the fiber end-piece by about 90°.

The present application refers to this second design of optical fiber end-pieces which comprise an inclined reflection surface and a curved, i.e. convex exit and/or entrance surface usable as a lens surface facing the integrated element, for example the active area of an opto-electronic active element, or an active or passive photonic element. This kind of fiber end-piece allows mounting the optical fiber with its elongate fiber portion oriented parallel to the main surface of the opto-electronic and/or photonic chip.

Whereas techniques for manufacturing and treating the thickened fiber end-piece exist, it is still an issue how to precisely and efficiently couple and/or align such ball-lensed fiber end-pieces to integrated elements. For positioning the semi-spherical ball lens of the fiber end-piece at the optimum position for optical coupling, according to some approaches fiber alignment is provided by fixing a section of an elongate fiber portion, which is quite close to the thickened fiber end-piece, by means of elongate grooves such as V-grooves into which the elongate fiber portion is insertable, to a pedestal on a mounting substrate carrying the chip or to at least one drop of glue material. However, there still is the need for an improved fiber coupling device which allows an even more precise, more efficient and less expensive procedure of optically coupling fiber end-pieces provided with a thickened ball lens to opto-electronic or photonic integrated elements.

There is a need for a fiber coupling device that renders the mounting of optical fibers, which have an end-piece comprising a reflection mirror and a convex exit and/or entrance surface, more accurate, less effort and/or less expensive and suitable for large-scale production.

Such a fiber coupling device is disclosed and claimed herein. In one embodiment, a fiber coupling device for coupling of at least one optical fiber where the fiber coupling device comprises at least one opto-electronic and/or photonic chip comprising at least one opto-electronic and/or photonic integrated element capable of emitting and/or detecting electromagnetic radiation. The fiber coupling device is configured for coupling the at least one opto-electronic and/or photonic integrated element to at least one fiber end-piece of an optical fiber having a reflection surface and a convex exit and/or entrance surface. And, the fiber coupling device further comprises a fiber end-piece alignment substrate configured for locally contacting and thereby supporting at least one convex exit and/or entrance surface of at least one fiber end-piece in an aligned position relative to the at least one opto-electronic and/or photonic integrated element.

In the present application, the device called 'fiber coupling device' per se need not necessarily include any fiber or fiber end-piece. Rather, a fiber coupling device, wherever addressed in the application, shall denote a device to which at least one fiber end-piece is mountable to. Accordingly, one or plural fibers or fiber end-pieces may be mounted to the fiber coupling device at a later point in time, thereby obtaining a connected fiber coupling device or fiber coupling arrangement which also includes at least the end-pieces of one or plural optical fibers.

Plural exemplary embodiments of the fiber coupling device are subsequently described with reference to the drawings.

DESCRIPTION OF THE FIGURES

FIGS. 1A and 1B show a fiber end-piece to be coupled to a fiber coupling device of any embodiments of the present application.

FIG. 1C shows a fiber-like end-piece shaped in the same way as a thickened fiber end-piece of an optical fiber.

FIG. 2 shows a fiber end-piece to be coupled to a fiber coupling device of the embodiments of the present application.

FIGS. 7A to 7C show alternative embodiments in which the alignment element for each fiber end-piece is an indentation.

FIGS. 10A to 10C show alternative embodiments with fiber end-piece alignment substrates comprising a lens surface.

Figure 3A:
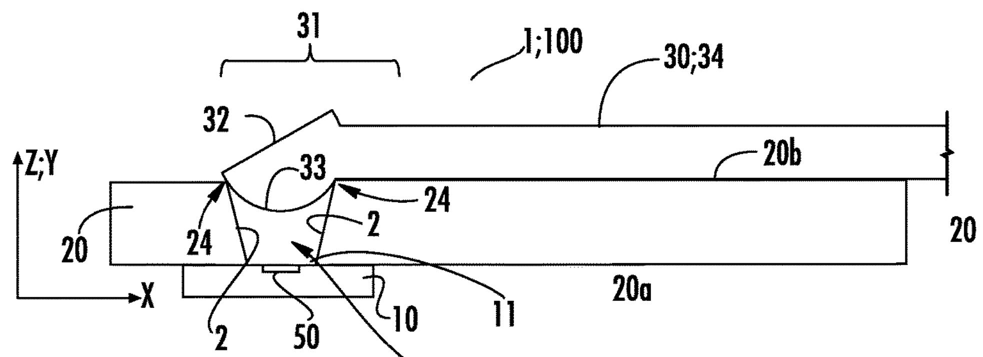
FIGS. 3A to 3C show cross-sectional views of embodiments of a fiber coupling device having a through-hole.

Further exemplary features of embodiments are discussed in the following detailed description.

DETAILED DESCRIPTION

FIGS. 1A, 1B and 2 show the type of fiber end-piece of optical fibers which the fiber coupling device of the present application is configured to be coupled to.

FIG. 1A shows an intermediate state of an optical fiber 30 during preparation of one of its end-pieces 31. The optical fiber 30, along its length, that is along its axial direction a, is elongate and comprises, as shown in cross-sectional view depicted in FIG. 1B, a fiber core 35 which is surrounded by a fiber cladding 37. The fiber cladding 37 has a diameter or cross-section defining the thickness of the elongate fiber or fiber portion 34. Whereas the optical fiber 30 and in particular its fiber cladding 37 will be uncoated in a section close to the fiber end-piece, along most of the fiber length a coating (not shown) will surround the fiber cladding 37. In the uncoated section, the perimeter of the fiber cladding represents the circumferential fiber surface 36 of the elongate fiber portion 34.

Before an end-piece of a fiber is mounted, it is treated so as to adopt the desired shape adequate for coupling to an opto-electronic or photonic integrated element. To this end, an uncoated, cleaved or otherwise exposed end region of the optical fiber 30 is heated above the melting point of the fiber material, thereby forming a thickened ball-like structure shown in FIG. 1A, such as a ball, drop or thickened bulge of molten fiber material which is then cooled. Such a thickened fiber end-piece 31 is commonly referred to as a ball lens; the surface of the thickened fiber end-piece 31 thus comprises an outer surface which is shaped as a sphere or at least has a partial surface formed approximately spherically; due to surface tension in the heated, liquid drop or bulge of fiber material. The thickened fiber end-piece 31, after cooling, thus comprises a curved, particularly convexly curved exit and/or entrance surface 33 through which a beam 45 of light or radiation 40 will pass when the fiber coupling device 1, which the fiber end-piece 31 is mounted to, is in operation.

As shown in FIG. 2, prior to fiber mounting, however, the thickened ball lens constituting the fiber end-piece 31 is cleaved, that is cut through, and polished along a direction roughly diagonal to the axial direction of the optical fiber. The cleaved and polished surface serves as a reflection surface 32 for deflecting the propagation direction of the beam 45 of radiation 40 inside the fiber end-piece 31 by about 90°, thus changing the propagation direction from axial to transverse, or vice-versa, depending on whether the beam of radiation 40, 45 will exit or enter the optical fiber 30 at this respective fiber end-piece 31. Due to the particular inclination angle of the reflection surface 32, total internal reflection is caused on the inside of the thickened fiber end-piece 31. However, instead of total internal reflection, alternatively partial reflection of a large portion of light intensity may also suffice. In the latter case, a mirror layer, a mirror coating or an arrangement of them (shown in dashed lines in FIG. 2) may be provided on the reflection surface 32. In one embodiment of total internal reflection, at the inclined reflection surface 32 the material of the optical fiber 30 is exposed, i.e. the material of the fiber core 35 and/or of the fiber cladding 37.

As shown in FIG. 1C, alternatively to a fiber end-piece 31 forming an integral part of an optical fiber, instead a separate, isolated fiber end-piece 31 may be provided which only comprises a thickened fiber-like end-piece and a short fiber portion. The fiber portion has a cylindrical shape and has a cross-sectional diameter corresponding to either the fiber core or to the fiber cladding of an optical fiber. However, the short fiber portion is yet to be connected to an optical fiber, such as by splicing. Whereas the fiber-like end-piece comprises a reflection surface 32 and a convex exit and/or entrance surface 33 shaped in the same manner as the fiber end-piece of an optical fiber (having a length of typically between 10 m and 2000 m), the elongate but short cylindrical portion integrally connected to the fiber-like end-piece of FIG. 2 is merely short enough to enable connecting, particularly splicing of a cleaved, flat fiber end-piece of an optical fiber to it. Accordingly, wherever a fiber end-piece will be mentioned in the present application, it may be an end-piece of an optical fiber or, alternatively, a fiber-like end-piece being shaped in the same manner as a fiber end-piece but to which an elongate optical fiber having a flat and/or cleaved end surface can be connected later.

The fiber-like end-piece, with its convex exit and/or entrance surface 33, may be coupled to the fiber coupling device of any embodiment of the present application. The other end of the fiber-like end-piece may be connected to an optical fiber later; which optical fiber then does not need to be provided with a thickened end piece. In the application, the term 'fiber end-piece' wherever used encompasses 'fiber-like end-piece' as well as 'fiber-like end-piece of an optical fiber'.

FIG. 2 shows the propagation of a beam of light 40;, 45 inside the fiber end-piece 31 to be coupled to a fiber coupling device, as already explained above with reference to FIGS. 1A and 1B.

FIG. 3A shows a first exemplary embodiment of a fiber coupling device 1; 100 coupled to at least one fiber end-piece 31 of an optical fiber 30 of the kind shown in FIG. 2. In the direction perpendicular to the drawing plane, in FIG. 3A as well as any of the subsequent figures, instead of only one optical fiber, likewise a plurality of optical fibers may be present to form an array or bundle of plural optical fibers all connected to the same fiber coupling device 1. However, the fiber coupling device 1 of any embodiment of the present application may be configured either for coupling to only one single fiber end-piece or for coupling to plural fiber end-pieces.

According to FIG. 3A, the fiber coupling device 1 comprises at least one opto-electronic and/or photonic chip 10 which comprises at least one opto-electronic and/or photonic element 50.

For the sake of brevity, the opto-electronic and/or photonic chip 10 will hereinbelow be addressed more concisely as chip 10, and the opto-electronic and/or photonic integrated element 50 will hereinbelow be addressed as integrated element 50. The integrated element 50 and the chip 10 may be opto-electronic or, alternatively, photonic.

In case that the integrated element 50 and the chip 10 are opto-electronic, the opto-electronic element 50 can be an active element, i.e. it can have an active area or active area surface. Particularly, the opto-electronic element 50 (i.e. active element or integrated element) may be a light-receiving, that is light-detecting integrated element, such as a photo diode or a photo detector. Alternatively, it may be a light-emitting integrated element, such as a VCSEL, a laser diode or another kind of light emitting diode (LED).

In case that the integrated element 50 and the chip 10 are photonic, the photonic integrated element may be an active element or a passive element. In case of a passive photonic element, it may, for example, be a grating coupler, such as a grating coupler for coupling light in or out of the photonic chip 10. The grating coupler may be configured for a propagation direction, outside the chip, being inclined by, for example, between 5° and 15° relative to the normal direction of the chip surface. Furthermore, the photonic chip 10 may comprise a photonic integrated circuit.

The opto-electronic or photonic integrated element 50 may be configured for detecting or emitting visible light of a wavelength or wavelength distribution between 380 and 780 nm. Alternatively, it may be configured for detecting or emitting infrared radiation, particularly radiation in the range of near infrared between 800 and 2500 nm, such as between 800 and 1700 nm. The opto-electronic or photonic element 50 may, for example, be constructed to emit or detect infrared radiation of one of the wavelengths of 850, 1300 and 1550 nm, for example, as often used in telecommunication applications.

In the cross-sectional view of FIG. 3A or of any of the subsequent figures, the fiber coupling device 1 may comprise either one single chip 10 or a plurality of chips 10; 10*a*, . . . , 10*d* (see FIGS. 17 and 18); each of these chips comprising one respective integrated element. Each chip 10; 10*a*, 10*b*, 10*c*, 10*d* may comprise only one respective integrated element 50; 50*a*, . . . , 50*d* (as shown in FIG. 18, for example). Alternatively, only one single chip or plural chips 10 may be provided, and the single chip 10 or, alternatively, each of the plural chips, may comprise a plurality of opto-electronic or photonic elements. For the sake of brevity, only one single chip 10 and only one single integrated element 50 will be addressed in the following.

Whereas FIG. 3A and most of the subsequent figures show a cross-sectional view of the fiber coupling device 1 along a first lateral direction x and a normal direction z, in the case of plural chips, integrated elements and fibers, these are lined up at respective positions along a second lateral direction y perpendicular to the drawing plane of FIG. 3A. Anyway, the fiber coupling device 1 comprises at least one chip 10 comprising at least one opto-electronic and/or photonic integrated element 50 to which at least one fiber end-piece 31 of at least one optical fiber 30 is coupled to or couplable to, i.e. to be coupled to later, during installation of the fiber coupling device 1.

According to FIG. 3A and the further embodiments of the application, the fiber coupling device 1 comprises a fiber end-piece alignment substrate 20 which is configured for locally contacting and thereby supporting, in an aligned position relative to the at least one integrated element 50, a curved exit and/or entrance surface 33 (FIG. 2) of at least one optical fiber end-piece 31 of at least one optical fiber 30.

In a conventional design of a fiber coupling device, the optical fiber or plurality of optical fibers is mounted to a mounting substrate on a surface on which also the chip is mounted; there both the chip and the optical fiber or fiber end-piece are mounted on the same main surface of the mounting substrate. Accordingly, the mounting substrate serves as a support substrate for both the chip or chips and the optical fiber or fibers 30. Conventionally, thus the same mounting surface of the mounting substrate is used for supporting each chip and each optical fiber. Sometimes, the optical fibers are mounted, rather to the support surface directly, to another top surface of a pedestal or other kind of support element, whereas the opto-electronic or photonic chip is directly mounted, by means of a ball grid array, to the mounting surface of the mounting substrate. Anyway, conventionally, a precise and efficient aligning procedure for aligning fiber end-pieces is often difficult to achieve for such conventional devices.

Though also the fiber coupling device 1 of FIG. 3A or of any subsequent embodiment of the application may likewise comprise a mounting substrate in addition (not illustrated in FIG. 3A), according to the embodiments of the application the fiber coupling device 1; 100 is constructed such that the chip or chips 10 on the one hand, and the optical fiber or fibers 30 on the other hand, are mounted or to be mounted to two opposite main surfaces of a substrate, which is a fiber end-piece alignment substrate 20. The fiber coupling device 1 according to the embodiments of the application thus comprises a substrate 20 interposed between or configured to be arranged in a position interposed between at least one opto-electronic or photonic chip 10 and at least one fiber end-piece 31 of at least one optical fiber 30. Accordingly, in contrast to conventional designs, the embodiments of the application refer to fiber coupling devices 1 comprising an intermediate substrate 20 to be positioned between the chips 10 and the fiber end-pieces 31. In particular, the optical fiber or fibers are mounted or mountable to a main surface 20*b* of the intermediate substrate 20 being opposite and thus facing away from that main surface 20*a* of the intermediate substrate 20 which the at least one opto-electronic and/or photonic chip 10 is mounted to. Accordingly, the intermediate substrate configured this way is a fiber end-piece alignment substrate 20 capable of aligning at least one thickened fiber end-piece 31 with respect to at least one opto-electronic and/or photonic element 50, especially along one or two lateral directions x, y. Furthermore, apart from lateral alignment, also the vertical or normal distance between the integrated element 50 and the fiber end-piece 31 may be aligned by means of the fiber end-piece alignment substrate 20. Due to its function to positionally align at least one fiber end-piece 31 to at least one integrated element 50, the intermediate substrate is from now on called fiber end-piece alignment substrate 20; or simply alignment substrate 20 it is configured for locally contacting and thereby supporting, in an aligned position relative to the at least one opto-electronic and/or photonic element 50, a curved exit and/or entrance surface 33 of at least one fiber end-piece 31 of at least one optical fiber 30 directly. The embodiments of the present application thus propose fiber coupling devices 1 comprising a fiber end-piece alignment substrate 20 being interposed between the opto-electronic and/or photonic chips and the fiber end-pieces, in an intermediate position such that the chips 10 and the optical fibers 30 are mounted to different, opposite main surfaces of the fiber end-piece alignment substrate 20 facing away from one another, that is in opposite directions (such as positive and negative z-direction).

As apparent from FIG. 3A, the at least one substrate 10 is mounted to a first main surface 20*a* (the lower or bottom main surface in FIG. 3A), whereas the at least one optical fiber 30, particularly the at least one fiber end-piece 31, is mounted to the other, second main surface 20*b* of the fiber end-piece alignment substrate 20 opposite to and thus facing away from the first main surface 20*a*.

The optical fiber or fibers do not necessarily form part of the fiber coupling device 1 of FIG. 3A or of the further figures or embodiments. However, at least the fiber end-piece alignment substrate 20 and the opto-electronic and/or photonic chip or chips 10 form part of the fiber coupling device 1. Each chip 10 is mounted to the first main surface 20*a* or, more generally, at least on a first side of the fiber end-piece alignment substrate 20, whereas each optical fiber 30 coupled or to be coupled to the respective integrated element 50 of the chip 10 or chips is mounted or mountable to the opposite, second main surface 20*b* or, more generally, on the opposite, second side of the fiber end-piece alignment substrate 20.

It is to be noted that, already before any fiber end-piece is mounted, the fiber end-piece alignment substrate 20 comprising the at least one opto-electronic and/or photonic chip 10 mounted to its first main surface 20*a*, or at least on its first side, already constitutes the fiber coupling device 1, whereas the at least one optical fiber 30 may be mounted later to it, to its second main surface 20*b* or, more generally, on its opposite, second side, thereby obtaining a connected fiber coupling device 1, that is a fiber coupling arrangement 100. Upon fiber mounting to the fiber coupling device 1, for example from above, the fiber coupling arrangement 100 is obtained which includes one or plural optical fibers 30, or at least fiber end-pieces 31, mounted to the fiber coupling device 1.

Alternatively, the embodiments of the fiber coupling device 1 in the present application may also be interpreted to additionally comprise the at least one optical fiber 30 or fiber end-piece 31. Then, the fiber coupling device 1 comprises at least one opto-electronic and/or photonic substrate 10, at least one optical fiber 30 or at least an end-piece 31 thereof, as well as the fiber end-piece alignment substrate 20, which is interposed between the chip and the fiber for holding them in predefined, perfectly aligned positions relative to one another. Anyway, according to both interpretations with or without the fibers already included, the fiber coupling device 1 of the embodiments of the application enables self-alignment of any fiber to a respective opto-electronic and/or photonic integrated element 50.

As a further feature of the embodiments of the fiber coupling device 1; 100 of the application, the respective fiber end-piece alignment substrate 20 is configured for locally contacting and/or supporting, in an aligned position relative to the at least one integrated element 50, a curved exit and/or entrance surface 33 of at least one optical fiber 30 or, more precisely, of its fiber end-piece 31. The thickened fiber end-piece 31 already comprises the curved, convex exit and/or entrance surface 33, a portion of which acts as a lens surface for collimating a beam of radiation 45 when passing it to the outside (or from outside to the inside, in case of a light-emitting integrated element to be coupled to it). Optionally, the radius of curvature of the surface 33 may be different along two directions perpendicular to one another. For example, the exit and/or entrance surface 33 may be an astigmatic lens surface. The surface 33 defines the outer shape of the thickened, roughly semi-spherical fiber end-piece 31 in those regions facing the fiber end-piece alignment substrate 20 which serves to contact and support the surface 33. The alignment substrate 20 is thus destined and configured to directly abut and thereby adjust, i.e. positionally align, the fiber end-piece surface 33 facing the opto-electronic and/or photonic integrated element 50. Accordingly, highly precise end-piece-to-integrated element alignment is achieved. Once the chip 10 and the alignment substrate 20 are mounted to one another in an aligned position, any fiber end-piece will be supported and correctly held in position relative to the respective associated integrated element 50 by means of the fiber end-piece alignment substrate 20, i.e. by its fiber end-piece aligning element 21. Mounting of the chip or chips 10 and of the alignment substrate 20 to one another can be done using pick-and-place handling routines. Furthermore, correct alignment of the chip or chips 10 relative to the alignment substrate 20, particularly relative to the fiber end-piece aligning element 21, can be controlled using visual alignment control techniques. For example, positional alignment of a circular or rectangular perimeter of a respective fiber end-piece aligning element 21, such as a through-hole or recess, relative to a circular or rectangular perimeter of a respective integrated element 50, may be monitored visually.

To this end, the fiber end-piece alignment substrate 20 comprises at least one fiber end-piece aligning element 21 configured for engagement with the curved or convex exit and/or entrance surface 33 of the at least one fiber end-piece 31. In the embodiments of FIG. 3A as well as FIGS. 3B and 3C discussed further below, the fiber end-piece aligning element 21 is a through-hole 23 in the fiber end-piece alignment substrate 20, which through-hole 23 may extend from the second main surface 20*b* to the first main surface 20*a* or, more generally, from one side of the fiber end-piece alignment substrate 20 to the other, opposite side of the fiber end-piece alignment substrate 20. Hereinbelow, for brevity, the fiber end-piece alignment substrate 20 will simply be called alignment substrate 20, and the fiber end-piece aligning element 21 will simply be called aligning element 21. The aligning element 21 serves to positionally fix and thereby align the exit and/or entrance surface 33 with regard to the alignment substrate 20 and, thereby, relative to the chip 10 mounted to the other side of the alignment substrate 20. Hereinbelow, for the sake of brevity, the exit and/or entrance surface 33 will often be called curved surface 33, convex surface 33 or simply surface 33. Anyway, always the surface 33 of the at least one fiber end-piece 31, that is the partial surface portion finally acting as the lens surface facing and/or engaging with the alignment substrate 20, is meant.

The function of the aligning element 21 in FIG. 3A or any subsequent figure is not necessarily restricted to fixing and thereby aligning the position of the curved surface 33 of the fiber end-piece 31. Optionally, the aligning element 21 may also serve to at least temporarily align, during manufacture of the fiber coupling device 1, the position of the at least one chip 10 relative to the first main surface 20*a*, particularly along the lateral directions x, y. For example, lateral alignment of the integrated element 50 of the respective chip 10 may be monitored through the through-hole 23 or any other kind of aligning element 21 of the alignment substrate 20, when not yet covered or hidden from view by the bulbous, convex surface 33 of the fiber end-piece 31 from above. Alternatively, the aligning element 21 may exclusively serve for the positioning of the surface 33 in an aligned manner, wherein separate alignment marks 9 (FIG. 4) may be provided on the first main surface 20*a* for lateral alignment of the substrate 10 when being about to be mounted to the alignment substrate 20.

Now particularly addressing FIG. 3A, the aligning element 21 is a through-hole 23 which may have a sidewall 2 or sidewalls 2 being tapered, for example being conical or otherwise inclined relative to the normal direction n; z of the alignment substrate 20. Furthermore, depending on the material of the alignment substrate 20, the aligning element 21 may have plural inner sidewalls, such as sidewalls being parallel to certain crystal plane orientations of the crystal lattice of the alignment substrate material. If observed from top view along the normal direction n, the aligning element 21 and particularly its upper edge at the second main surface 20*b* may be circular, elliptical, quadratic or rectangular in shape, for example. However, since the convex surface 33 of the fiber end-piece 31 at least locally will abut to and thus be supported by the aligning element 21 or its upper edge, the semi-spherical ball lens or fiber end-piece 31 can no longer move or been offset from the opening provided by the aligning element 21 in the alignment substrate 20. Thereby, upon engagement of the curved fiber end-piece surface 33 and the aligning element 21 of the alignment substrate 20, the position of the fiber end-piece is fixed in its optimum, pre-aligned coupling position, thereby ensuring maximum light transmission between the optical fiber 31 and the integrated element 50 mounted on the opposite side of the substrate 20.

It is to be noted that the alignment of the curved surface 33 achieved by means of the at least one aligning element 21 may include positional alignment and may, optionally, further include orientational alignment. Even orientational alignment in the azimuthal direction, around the axial direction a or x, is achievable automatically, especially very easily, by providing a plurality of at least two, and in one embodiment four fiber end-pieces 31 and/or fibers 30 connected to one another so as to form a ribbon-like multi-fiber-member, i.e. a multi-fiber-ribbon, which is engageable with the plurality of respective aligning elements 21.

Further, in case that a plurality of opto-electronic and/or photonic chips 10, integrated elements 50 and fibers 30 having bulbous fiber end-pieces 31 are provided, there are at least three conceivable embodiments for realizing FIG. 3A or any of the subsequent figures. Firstly, the fiber end-piece alignment substrate 21 may comprise a plurality of separate fiber end-piece aligning elements 21 whose number corresponds to the number of chips, integrated elements and fiber end-pieces. Secondly, a combined fiber end-piece aligning element 21 may be provided for engagement with the fiber end-pieces 31 of all optical fibers 30. Thirdly, smaller groups, for example pairs of neighboring fiber end-pieces, may engage with the respective same aligning element 21. Accordingly, although the cross-sectional views shown in FIGS. 3A to 16 show only one aligning element 21 (positioned in the drawing plane), instead a plurality of aligning elements 21 and fiber end-pieces 31 (disposed at different positions along the second lateral direction y) may be provided; their number then corresponds to the number of chips 10 with integrated elements 50 to be coupled to the fibers 30. However, the number of aligning elements 21 also corresponds to the number of chips 10, integrated elements 50 and fibers 30; with each respective fiber end-piece aligning element 21 serving to support, engage with and thereby align only one respective fiber end-piece 31 or convex surface 33 thereof. Any aligning element 21 may have an upper edge, i.e. a supporting edge 24 that is circular.

There are further optional features realizable alone or in combination with one another in FIG. 3A or in any of the subsequent figures and further embodiments of the application. For example, the fiber coupling alignment substrate 20 may be a semiconductor substrate, a glass substrate, a metal substrate or a dielectric substrate. In case of a semiconductor substrate, a silicon substrate, a gallium arsenide substrate, an indium phosphide or silicon phosphide substrate may be used, among others. For example, silicon is transparent in the range of near infrared and may thus be chosen for embodiments with other kinds of aligning elements 21 than through-holes 23, such as recesses or even elevating elements raised above the main surface 20*b* of the alignment substrate 20, where no opening of through-hole for passage of radiation is provided. Techniques of etching silicon, other semi-conductive or dielectric materials are well known in semiconductor manufacture and may be applied here, for example for the purpose of realizing precisely defined angles of orientations of the tapering inner sidewalls 2 of the aligning element 21 inside a through-hole 23, or inside a recess which only partially extends through the thickness of the alignment substrate 20, or a wall of any kind of indented or elevated aligning structural element. Also for protruding structural elements which raise above the second main surface 20*b*, tapering angles of outer and/or inner sidewalls may be shaped by applying semiconductor manufacture techniques. In case of a silicon substrate or another semiconductor substrate, such as a monocrystalline substrate, i.e. piece of wafer or semiconductor chip may be used. The monocrystalline substrate allows etching profiles according to distinct crystal plane orientations of the etched surfaces or sidewalls.

Also for a glass substrate, established glass etching techniques are applicable. Since glass and various dielectric materials are transparent at least for visible light, these materials may be chosen for alignment substrates 20 which have other kinds of aligning elements 21 than through-holes 23. In case of forming through-holes 23 or recesses, however, laser drilling may be used, for example.

Figure 3B:
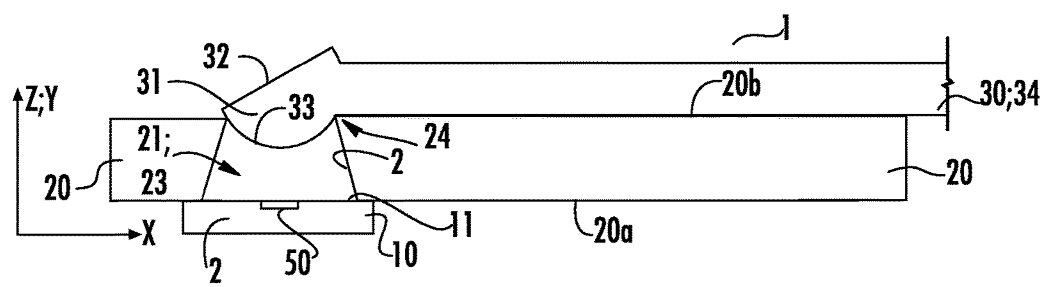
Figure 3C:
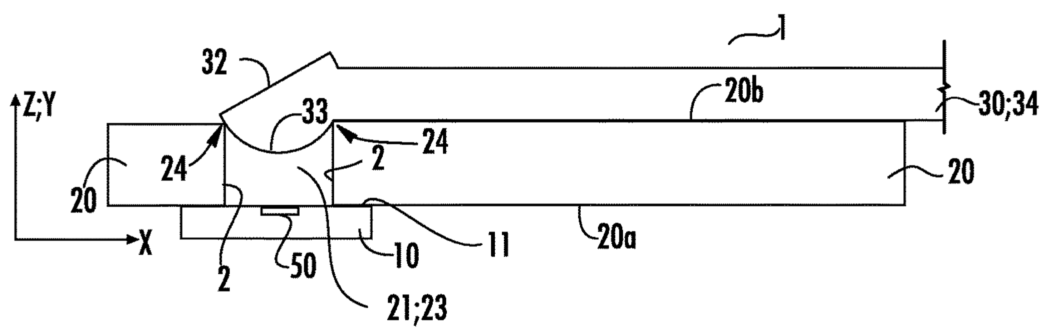

FIGS. 3B and 3C show cross-sectional views of similar embodiments of a fiber coupling device 1 having a different shape of the through-hole 23. According to FIG. 3B, the through-hole 23 is tapered such that its lateral cross-section or diameter increases with maximum depth from the upper, second main surface 20*b* towards the lower, first main surface 20*a* where the chip 10 with the integrated element 50 is mounted. The through-hole 23 shaped this way may be formed, for example, by substrate etching from the opposite, first main surface 20*a*. This through-hole profile may be realized for obtaining a sharper upper edge serving as a supporting edge 24 of the through-hole 23, with an acute angle of substrate material at the circumferential contact area where the substrate material abuts, i.e. locally contacts and/or supports the bulging surface 33 of the fiber end-piece 31.

Alternatively, according to FIG. 3C, a cylindrical through-hole 23 may be etched or drilled, for example by laser drilling, or otherwise formed in the substrate material of the alignment substrate 20. In FIGS. 3A to 3C, the diameter or cross-section of the upper, supporting edge 24 which positionally aligns the fiber end-piece surface 33 may be shaped so as to provide a predefined distance of the bulging surface 33 from the surface of the integrated element 50.

However, the diameter or cross-section of the supporting edge 24 (the upper edge in FIGS. 3A to 3C) of the through-hole 23, observed from top view along the normal direction n of the alignment substrate 20, is chosen such that the elongate fiber portion 34, even at its section closest to the enlarged fiber end-piece 31, is abutting the upper, second main surface 20*b* of the alignment substrate 20. Abutting of the alignment substrate 20 and of the fiber end-piece surface 33, wherever addressed in the application, may involve direct mechanical contact, at least locally, and with no adhesive or glue material between them. In those embodiments where the fiber end-piece aligning element 21 is a through-hole or a recess having a bottom surface, in addition to direct mechanical contact between the alignment substrate 20 and of the fiber end-piece surface 33, a cavity enclosed by the curved fiber end-piece surface 33 and the through-hole or recess may be filled with adhesive or glue material, especially when another curved surface except for the curved fiber end-piece surface 33 is provided, such as an additional lens or lens surface in or beneath the alignment substrate 20 (see further below).

In any of the figures and further embodiments of the application, the aligned coupling position of the optical fiber may thus be secured by gluing the optical fiber to the second main surface 20*b* of the alignment substrate 20 or at least to the respective side of the alignment substrate 20 facing away from the at least one opto-electronic and/or photonic chip 10.

Due to the engagement of the fiber end-piece aligning element 21 (such as a through-hole 23, a recess or a protruding elevated structural element) with the convex surface of the thickened fiber end-piece 31, it may suffice to glue or otherwise fix exclusively the elongate fiber portion 34 to the second main surface 20*b* laterally outside the aligning element 21. Even in embodiments where also regions of the curved surface 33 are glued to the respective aligning element 21 (see FIG. 10B), gluing only serves to permanently preserve the optimum coupling position of the fiber end-piece 31 and, in particular, of its exit and/or entrance surface 33, on and/or within the alignment substrate 20, which optimum coupling position is achieved automatically, without any glue material, due to the passive alignment enabled by means of the very existence of the fiber end-piece aligning element 21 of the fiber end-piece alignment substrate 20. However, passive alignment is automatically achieved by the direct abutting contact of the curved surface 33 and the supporting edge 24, or other kind of contact region, of the respective aligning element 21. Accordingly, for preserving the optimum coupling position, it suffices to glue the elongate fiber section to the alignment substrate.

In some embodiments, the alignment substrate 20 has lateral dimensions, along the directions x, y parallel to its main surfaces, being larger than those lateral dimensions of any opto-electronic and/or photonic chip 10 mounted to it; the substrate 20 thus extends beyond any of these chips in at least one, two or three lateral directions (positive x-direction; positive and/or negative y-direction).

The alignment substrate 20 may be configured to not only support and automatically align the curved fiber end-piece surface 33, but also to support at least a section of a circumferential fiber surface 36 (FIG. 1B) of the elongate fiber portion 34. Whereas the second main surface 20*b* in FIG. 3A and in any subsequent figure is depicted as being flat and planar, it is to be noted that according to any of these and other embodiments it may be patterned, even laterally outside the at least one fiber end-piece aligning element 21. For example, the main surface 20*b* may comprise one or plural grooves, such as V-grooves or U-grooves on top of it for supporting and to some extent aligning also the elongate fiber portions. The at least one aligning element 21 is shaped to positionally align the respective fiber end-piece along the first as well as the second lateral direction x, y and, may be, additionally along the vertical direction z or normal direction n of the main surface 20*b*. Accordingly, any grooves for positioning the elongate fiber portions 34 are only additional patterns which actually are expendable or at least are not required for positionally fixing the fiber end-piece along two or three directions. However, the elongate fiber portion 34 may additionally be secured by a groove on the second main surface 20*b*.

Figure 4:
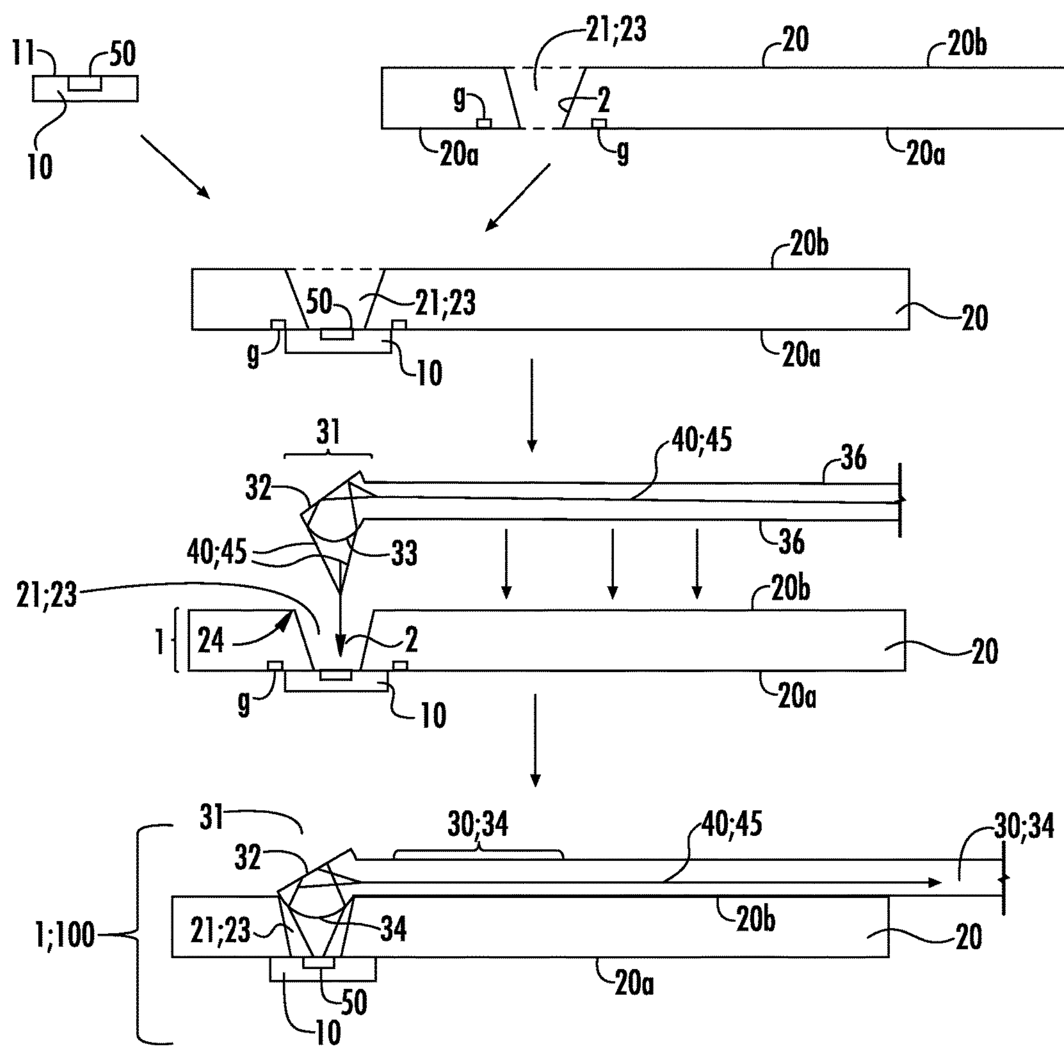
FIG. 4 shows an exemplary routine for assembling a fiber coupling device.

FIG. 4 shows an exemplary routine for assembling the fiber coupling device 1. First, each opto-electronic and/or photonic chip 10 is mounted, with its main surface 11 comprising the integrated element 50, to the first main surface 20*a* of the alignment substrate 20 in a position aligned in both lateral directions x, y, relative to the fiber end-piece aligning element 21, such as a through-hole 23, a recess or an elevated structural element (see further below). In case of a through-hole 23, the chip 10 is mounted with the integrated element 50 symmetrically in and/or around the center, in both lateral directions of the through-hole 23. This is done for any chip to be mounted to the alignment substrate 20. The routine of FIG. 4 then proceeds with mounting at least one optical fiber 30 with its thickened fiber end-piece 31 to the fiber end-piece aligning element 21 of the alignment substrate 20. During fiber mounting, the convexly curved exit and/or entrance surface 33 facing the second main surface 20*b* of the alignment substrate 20 engages with the aligning element 21, i.e. through-hole 23, when approaching it and/or or being pressed against it. In the mounting position, the fiber end-piece 31 covers the through-hole 23 and abuts and supported by the supporting edges 24, i.e. upper edge of the through-hole 23 forming the perimeter of the aligning element 21 in the plane of the second main surface 20*b*. In this position, the fiber 30 may be glued or otherwise secured to the alignment substrate 20, for example by means of an adhesive applied before mounting the fiber to the substrate and is cured, i.e. hardened by means of UV radiation. During UV curing of the adhesive, the fibers may be pressed or held against the alignment substrate 20, for example with the help of a lid.

Generally, the vertical end position of the fiber end-piece may be predefined by appropriately selecting the lateral diameter or cross-section of the through-hole 23 or other kind of aligning element 21, at the upper, supporting edge 24 in the plane of the second main surface 20*b* and dependent on the diameter of the fiber end-piece ball lens predefining the radius of curvature of the entrance and/or exit surface 33. The perimeter, i.e. supporting edge 24 of the aligning element 21 may contact and support the surface 33 and, whereas the main surface 20*b* supports the elongate fiber section 34. The radius of curvature of the ball lens or exit and/or entrance surface 33 then is the square root of the difference between the upper radius of the opening of the through-hole or aligning element, i.e. the radius of the circumferential supporting edge 24, squared and the radius of the elongate fiber section squared. Vice-versa, with the uppermost radius of the aligning element 21 as defined by the circular supporting edge 24 and with the radius of the elongate fiber section, i.e. of its circumferential fiber surface 36 (FIG. 1B) given, the appropriate radius of curvature of the convex surface 33 is given by the square root of the sum of the radius of curvature of the supporting edge squared plus the radius of the elongate fiber section squared.

Due to the fiber end-piece aligning element 21 such as a through-hole 23, for example, the fiber end-piece 31 is in perfect alignment with the integrated element 50. Accordingly, the beam 45 of electromagnetic radiation 40 will arrive at the active area of the integrated element 50 in a centered, aligned position. Alternatively, in case of a radiation emitting integrated element 50, the emitted radiation will enter and pass the entrance surface 33 and be reflected at the inclined reflection surface 32 so as to enter the fiber core of the elongate fiber section in a centered position.

As further indicated in FIG. 4, alignment marks 9 may be provided on the first main surface 20*a* of the alignment substrate 20. They facilitate alignment of the chip or chips 10 to the first main surface 20*a*, with respect to one or both lateral directions relative to the position of the at least one fiber end-piece aligning element 21, during chip mounting to the substrate 20. Especially in case of those subsequent figures where the aligning element 21 is not a through-hole 23 and thus will not extend down to the first main surface 20*a*, corresponding alignment marks such as those 9 indicated in FIG. 4 may be provided. However, for brevity, for the further figures no alignment marks will be described explicitly.

The sequence of steps of the routine of FIG. 4 may be reversed so as to first mount the fiber to the substrate and execute substrate mounting afterwards.

Figure 5:
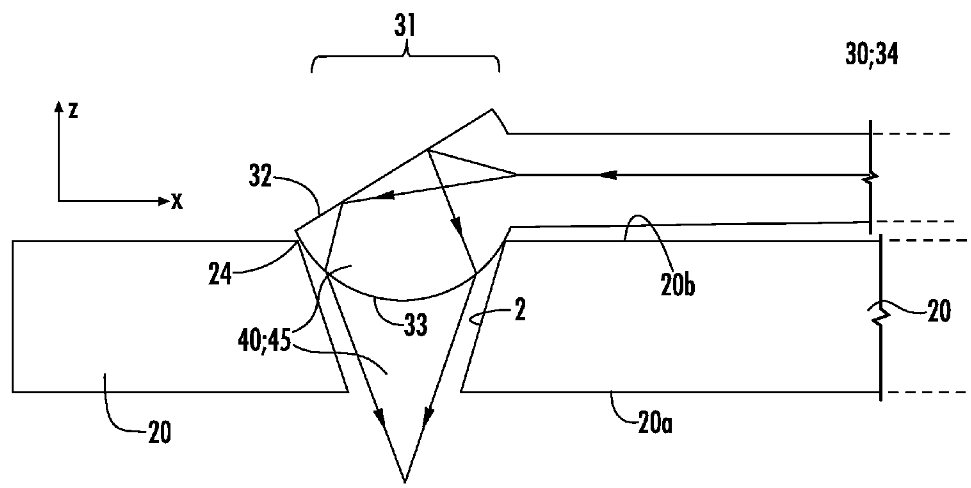
FIG. 5 shows an enlarged partial view of a fiber end-piece 31 mounted to an alignment substrate.

FIG. 5 shows an enlarged partial view where the fiber end-piece 31 is mounted to the alignment substrate 20 before having mounted the substrate 10. FIG. 5 shows the beam diameter of the beam of radiation 40; 45 which widens in the fiber end-piece 31, is reflected at the inclined reflection surface or mirror surface 32, passes the exit surface 33 by which it is focused according to a focal distance from the center of the radius of curvature of the ball lens 33. The focal distance is on the other side of the alignment substrate 20.

Figure 6:
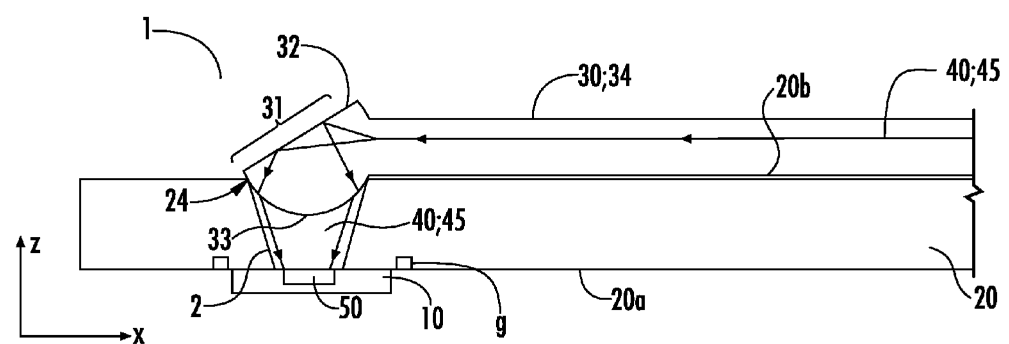
FIG. 6 shows the path of light propagation in a fiber coupling device corresponding to FIG. 3A.

FIG. 6 shows the final, assembled fiber coupling device 1 where the substrate 10 is mounted to the alignment substrate 20. The beam of radiation reaches the active area of the opto-electronic and/or photonic integrated element 50 which may be arranged in or, as shown, closer to the alignment substrate 20 than the focal distance shown in FIG. 5. In FIG. 6 as well as in most of the figures of the application, a mounting substrate underneath the substrate 10 and/or a housing may be additionally provided although not shown explicitly.

It is to be noted that any feature mentioned above with regard to FIGS. 1A to 2, with regard to FIGS. 3A to 3C or to FIGS. 4 to 6 may equally apply to any other subsequent figure or embodiment of the application. Accordingly, any of the above features may be combined with the further figures and embodiments but will not be addressed repeatedly for the sake of brevity. Furthermore, any combination of these features may be applied to any one of the following further figures and embodiments.

FIGS. 7A to 7C show alternative embodiments in which the alignment element 21 for each fiber end-piece 31 is an indentation, blind hole, i.e. blind via or other kind of recess 22 in the second main surface 20*b* or at least on the second side of the fiber end-piece alignment substrate 20. Accordingly, the aligning element 21 or recess 22 only partially extends through the thickness of the alignment substrate 20 and has, in addition to the lateral sidewall or sidewalls 2, a bottom surface 8. According to FIGS. 7A to 7C, for the alignment substrate 20 a material is chosen that is transparent for the wavelength or range of wavelengths of radiation to be transmitted between the integrated element 50 and the optical fiber 30, such as silicon in case of near infrared radiation, for example. As in FIGS. 3A to 3C, the upper, supporting edge 24 delimiting the aligning element 21 from the surrounding second main surface 20*b* contacts the exit and/or entrance surface 33 of the fiber end-piece 31 directly. The surface 33 engages with the aligning element 21, thereby being aligned properly with regard to the integrated element 50. Optionally, alignment marks 9 may be provided for mounting of each substrate 10 properly, with the center of its integrated element 50 being flush with the center of the recess 22, through-hole 23, elevated structural element (see further below) or other kind of aligning element 21. FIGS. 7B and 7C show alternative embodiments in which the angle of tapering of the sidewall or sidewalls 2 of the recess 22 are negative or zero, respectively.

In the embodiments of FIG. 3A to 7C described so far, the substrate 10 may be mounted to the alignment substrate 20 by means of flip-chip technology. Flip-chip mounting may be performed in bulk quantities on a large scale using available automated machinery ensuring high-precision alignment between the opto-electronic substrate 10 and the fiber end-piece alignment substrate 20. Lateral alignment of the substrate 10 to the alignment substrate 20 may be performed using alignment marks, such as those exemplarily shown in FIGS. 3A to 3C or 7A to 7C, and/or with the help of standardized pick-and-place technology already existing.

Figure 8:
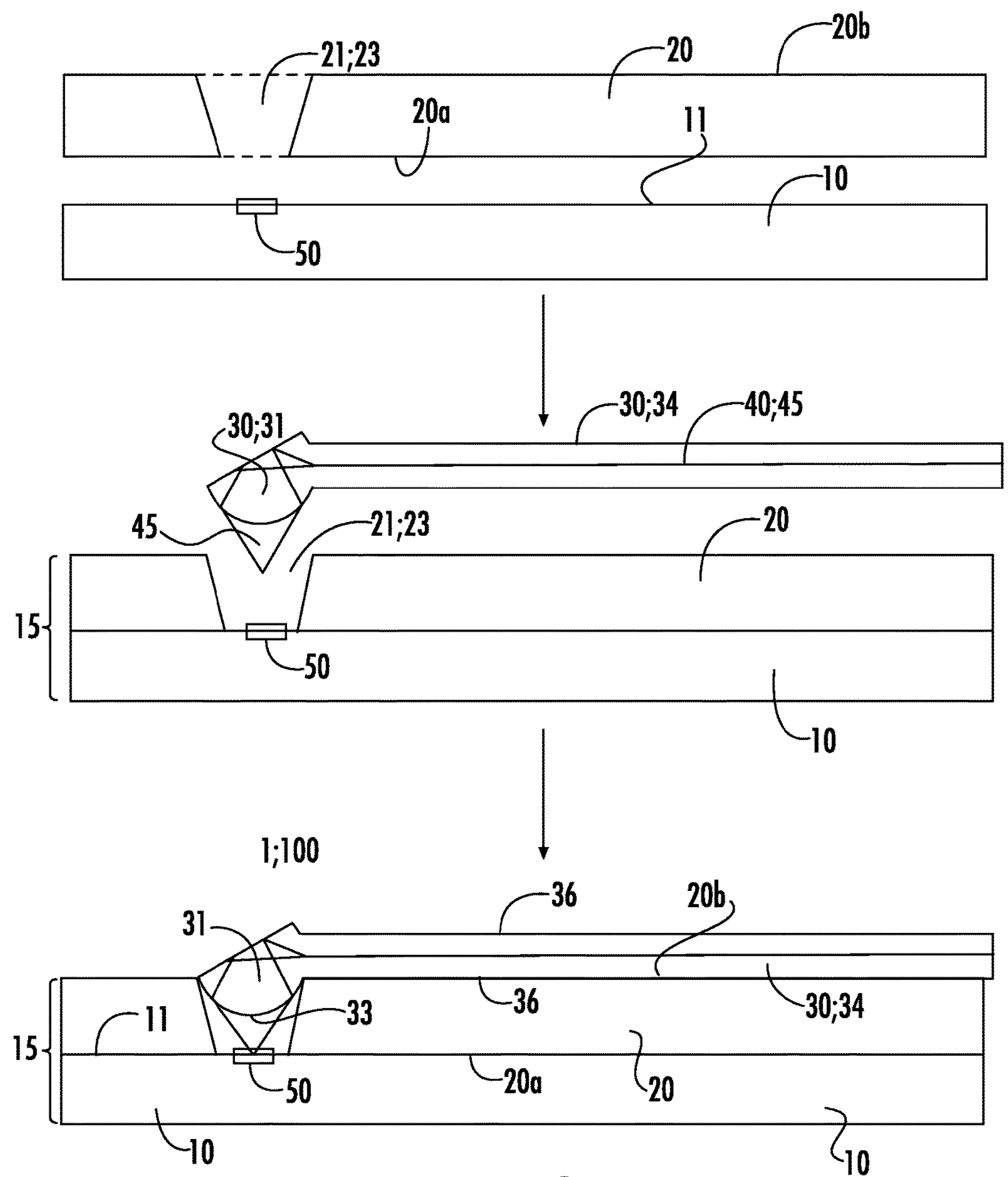
FIGS. 8 and 9 show two routines for assembling a fiber coupling device using wafer level bonding.
Figure 9:
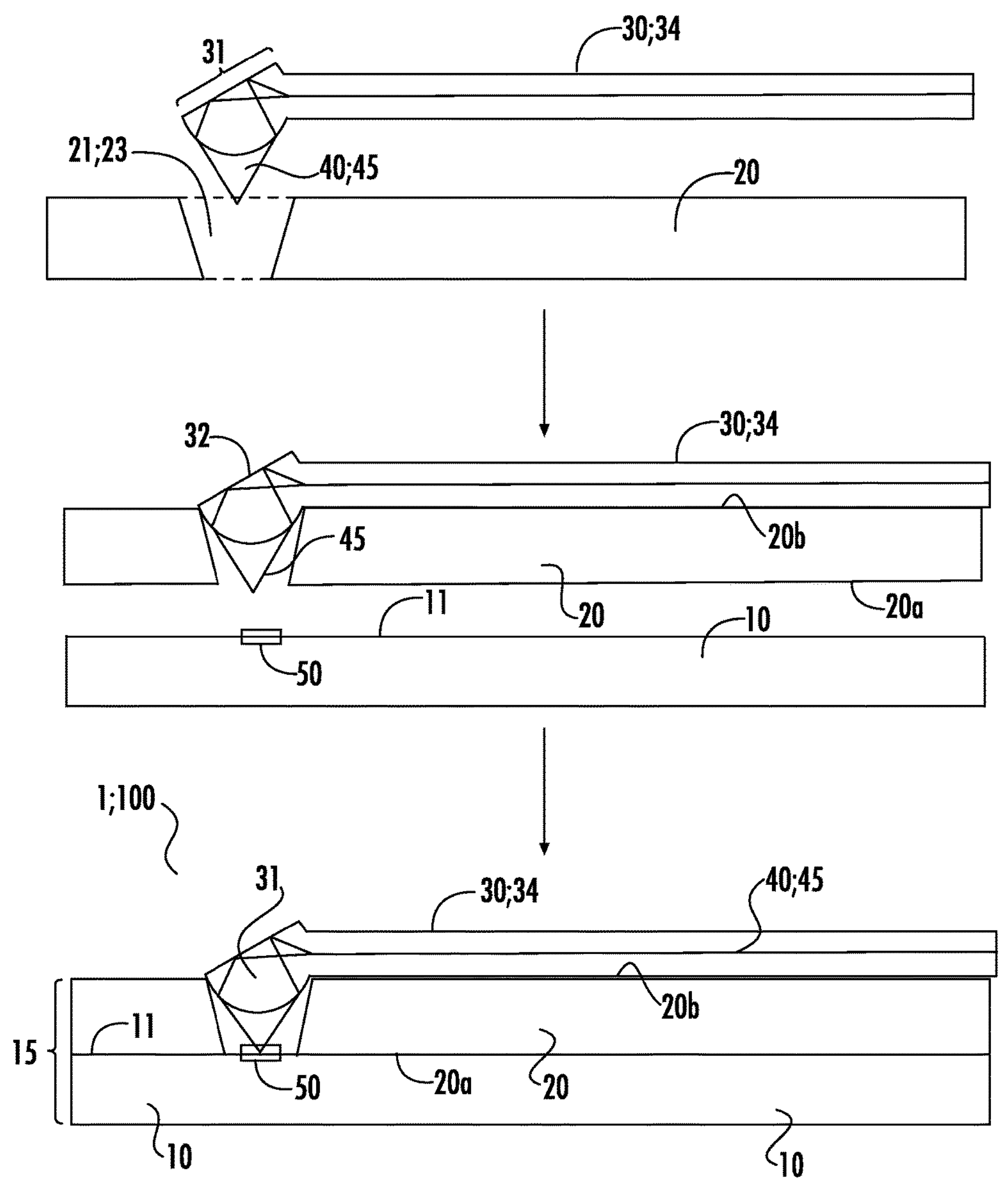

FIGS. 8 and 9 show two routines for assembling an alternative embodiment of a fiber coupling device 1 in which wafer level bonding is applied. These embodiments may apply to fiber coupling devices 1 comprising a plurality of integrated elements 50, aligning elements 21 and fiber end-pieces 31. The number of the integrated elements 50 corresponds to the number of aligning elements 21 and to the number of fiber end-pieces 31 or optical fibers 30 coupled to or yet to be coupled to the fiber coupling device 1. For example, a fiber coupling device 1 comprises four integrated elements 50 to which four fiber end-pieces are coupled in an aligned position by means of four aligning elements 21. However, the embodiments of FIG. 8 or 9 may equally be applied for fiber coupling devices comprising only one integrated element. For any embodiment in which a plurality of fibers or fiber end-pieces is coupled, the plurality of fibers may be applied as a ribbon or ribbon-like element comprising all fibers of the plurality of fibers. For example, a ribbon of four uncoated, but commonly connected fibers may be mounted to the second main surface 20*b* of the alignment substrate 20. Since the plural fiber end-pieces 31 of all fibers 30 are at least indirectly connected to one another, i.e. by means of the respective elongate fiber portions 34 combinedly representing the multi-fiber ribbon comprising the plural fibers, no or almost no rotation of the mirrors, i.e. inclined reflection surfaces 32 around the axial direction a; x, that is in the azimuthal direction can occur. Accordingly, upon attaching of the ribbon to the alignment substrate, or of the plural convex surfaces 33 to the respective aligning elements 21 or their upper edges 24, no orientational misalignment around the x-direction, that is along the y-direction of the beam propagation, can occur.

According to FIGS. 8 and 9, the opto-electronic and/or photonic substrate 10 and the fiber end-piece alignment substrate 20 may be mounted together, with their respective main surfaces 11, 20*a*, using wafer level bonding techniques. Thereby, a composite substrate 15 is provided having one or a plurality of integrated elements 50 beneath one or a plurality of fiber end-piece aligning elements 21. Although a through-hole 23 is depicted in FIGS. 8 and 9, other kinds of fiber end-piece aligning elements such as recesses or elevated structures, in particular ridges, studs, bumps or bulges, for example, may be provided instead.

In FIGS. 8 and 9, in case that a plurality of integrated elements 50 is provided, one single opto-electronic and/or photonic substrate 10 will comprise all of the integrated elements 50. The substrate 10 may have lateral extensions of its main surface corresponding to those of the main surface of the fiber end-piece alignment substrate 20 to which it is bonded to. According to FIG. 8, a composite substrate 15 is formed first due to wafer level bonding, before the fiber or plurality of fibers 30 is mounted to it, with the convex surfaces 33 of the fiber end-pieces, i.e. ball lenses engaging with and being supported by the fiber end-piece alignment elements 21 or upper edges thereof. In FIG. 9, the fibers are mounted to the fiber end-piece alignment substrate 20 in their aligned positions first, before the opto-electronic and/or photonic chip 10 is mounted to the opposite side of the alignment substrate 20 by means of wafer level bonding or any other technique. For example, instead of wafer level bonding, a plurality of fiber end-piece alignment substrates 20 may be bonded to a top surface of an opto-electronic or photonic wafer which is then diced or otherwise singulated into a plurality of fiber coupling devices 1 each having an individual opto-electronic or photonic chip 10. Alternatively, a plurality of opto-electronic or photonic chips 10 may be bonded to a top surface of a multi-fiber end-piece alignment wafer which wafer comprises a plurality of fiber end-piece alignment substrates 20 and which wafer is then diced or otherwise singulated into a plurality of fiber coupling devices 1.

FIGS. 10A to 10C show alternative embodiments in which the alignment substrate 20 comprises at least one lens surface 7 in addition to the at least one aligning element 21. Under each aligning element 21, a corresponding lens surface 7 is provided in an aligned position, particularly aligned along both lateral directions x, y. The lens surface provides a lens element of the alignment substrate, such as a condenser lens or collimator lens for focusing or further focusing the beam of radiation 40; 45 so as to shorten the focal distance of the fiber end-piece 31. In the example of FIGS. 10A to 10C, the at least one aligning element 21 is a recess 22 but could also be a through-hole or an elevated structure. In case of a recess 22 as shown, it may be filled with a glue material or adhesive which may be hardened for securing the convex surface 33 of the fiber end-piece 31, with a large surface area of it, to the inner volume of the recess or other kind of aligning element 21. Due to the presence of the at least one lens surface 7, it suffices to use the convexly shaped ball lens surface 33 of the fiber end-piece 31 for fiber position alignment, whereas the focusing effect of the convex surface 33 need not be exploited in addition. In case of an adhesive material but transparent material inside the recess, i.e. between the recess and the convex fiber end-piece surface 33 as indicated by a hatching in FIG. 10B, the convex surface 33 is not only supported and secured along the circular perimeter line as defined by the supporting, upper edge 24 of the recess 22, but also with the entire surface area of the convex surface 33 inside the recess 22 or other kind of aligning element 21.

In FIGS. 10A to 10C, the shape of the recess 22 and the tapering angle of its sidewalls 2 is chosen differently. Furthermore, the lens surface 7 is provided at the opposite, first main surface 20*a* facing the opto-electronic and/or photonic substrate or substrates (not illustrated). The lenses formed by means of a lens surface 7 may be monolithically integrated into the alignment substrate 20 and may thus be formed of the same material as the alignment substrate 20. Instead of a collecting, that is convergent or collecting lens or lens surface, a diverging lens or lens surface may be formed. Furthermore, either the first main surface 20*a* or the bottom surface 8 of the aligning element 21, or both of these surfaces may be formed as collecting and/or diverging lens surfaces 7 for appropriately shaping the waist and/or diameter of the beam of radiation. Again, in these embodiments, the material of the alignment substrate 20 is chosen to be transparent for the radiation to be transmitted. The lens formed by means of the at least one lens surface 7 may, for example, be a plano-convex lens, as is the ball lens formed between the inclined reflection surface 32 and the convex surface 33 of the fiber end-piece 31.

Figure 11:
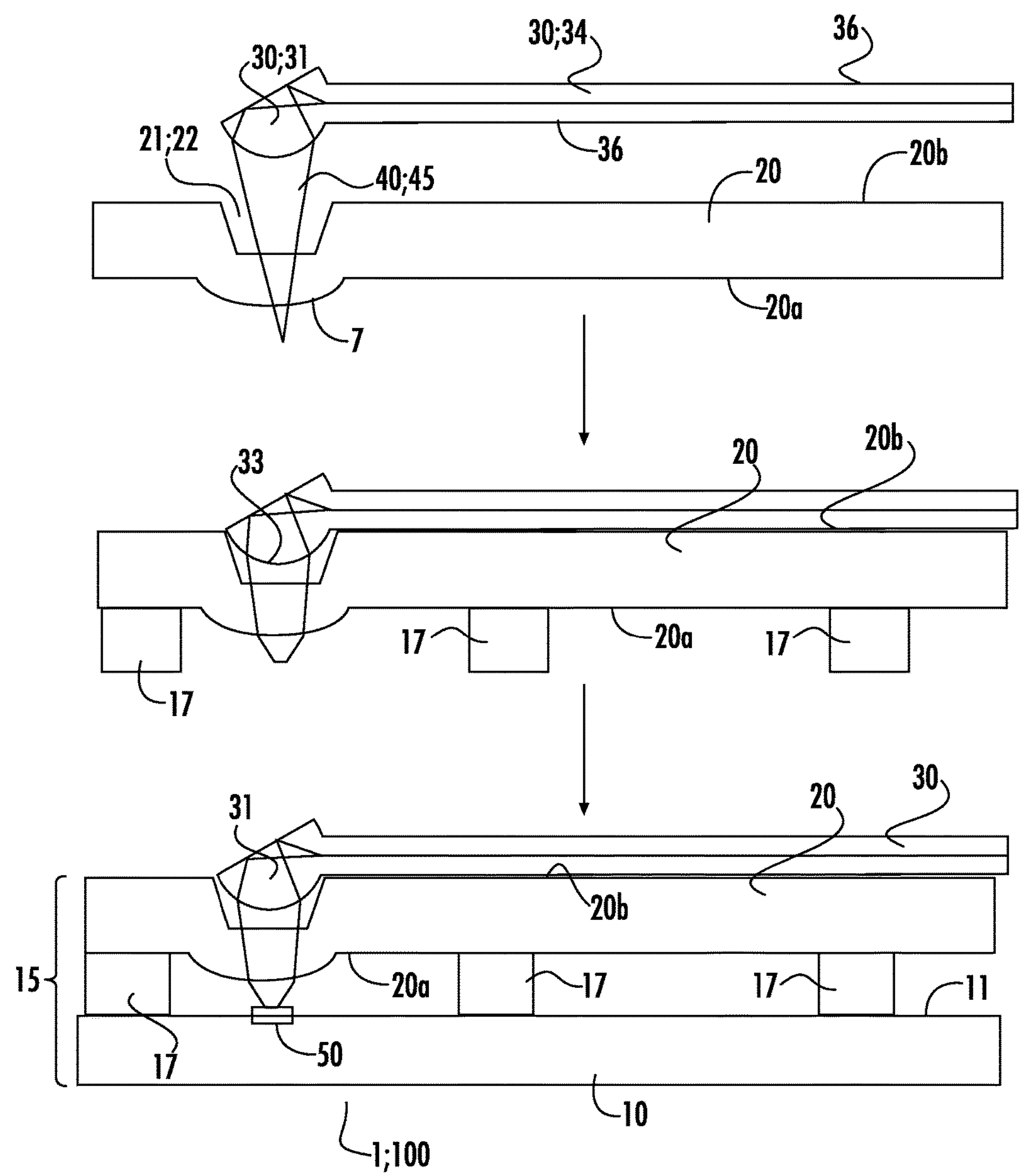
FIG. 11 shows a routine of assembling a fiber coupling device having spacer elements.

FIG. 11 shows an embodiment regarding mounting of the at least one opto-electronic and/or photonic substrate 10 beneath a fiber end-piece alignment substrate 20 comprising at least one lens element 6 at its first main surface 20*a*, that is the surface opposite to the main surface 20*b* to be mounted to the fibers. Particularly in case where the lens surface 7 is convex and protrudes beyond the back surface 20*a*, the opto-electronic and/or photonic substrate 10 comprising the at least one integrated element 50 may be mounted near the surface 20*a* of the alignment substrate 20 at a distance from it, for example, by means of either an intermediate layer having a cutout or a through-hole at and/or closely around the at least one lens surface 7 and/or fiber end-piece aligning element 21 (not shown), or, alternatively, by means of a plurality of spacer elements 17 provided between the main surfaces 11, 20*a* of the substrates 10, 20. The spacer elements 17 are arranged at different lateral positions, at least around the lens surface 7 and/or aligning elements 21, on the first main surface or back surface 20*a* of the alignment substrate 20 as well as on the main surface 11 of the opto-electronic substrate 10 facing it.

FIG. 11 shows a routine in which the fibers 30 are first mounted to the alignment substrate 20 before the spacer elements 17 are formed and/or mounted to the opposite main surface 20*a*, i.e. the rear surface thereof. Finally, the opto-electronic substrate 10 is mounted to the plurality of spacer elements 17 or to the intermediate layer provided instead. Alternatively, the spacer elements 17 may first be formed on and/or mounted to the main surface 11 of the opto-electronic and/or photonic substrate 10, before the alignment substrate 20, with or without the optical fibers mounted, is mounted to the spacer elements. When both substrates 10, 20 are mounted to one another by means of the spacer elements 17 or another intermediate layer (not illustrated) or a combination of them, again, a composite substrate 15 is obtained which provides space, between the individual substrates 10, 20, for lens surfaces 7 which are convex and approach more closely to the integrated element or elements 50 than the surrounding first main surface 20*a* does, along the vertical direction z.

Whereas according to FIG. 11, the fibers are mounted to the alignment substrate 20 prior to the step of assembling the composite substrate 15, instead these steps may be reversed so as to first form and/or assemble the composite substrate, before finally mounting the fibers.

Figure 12:
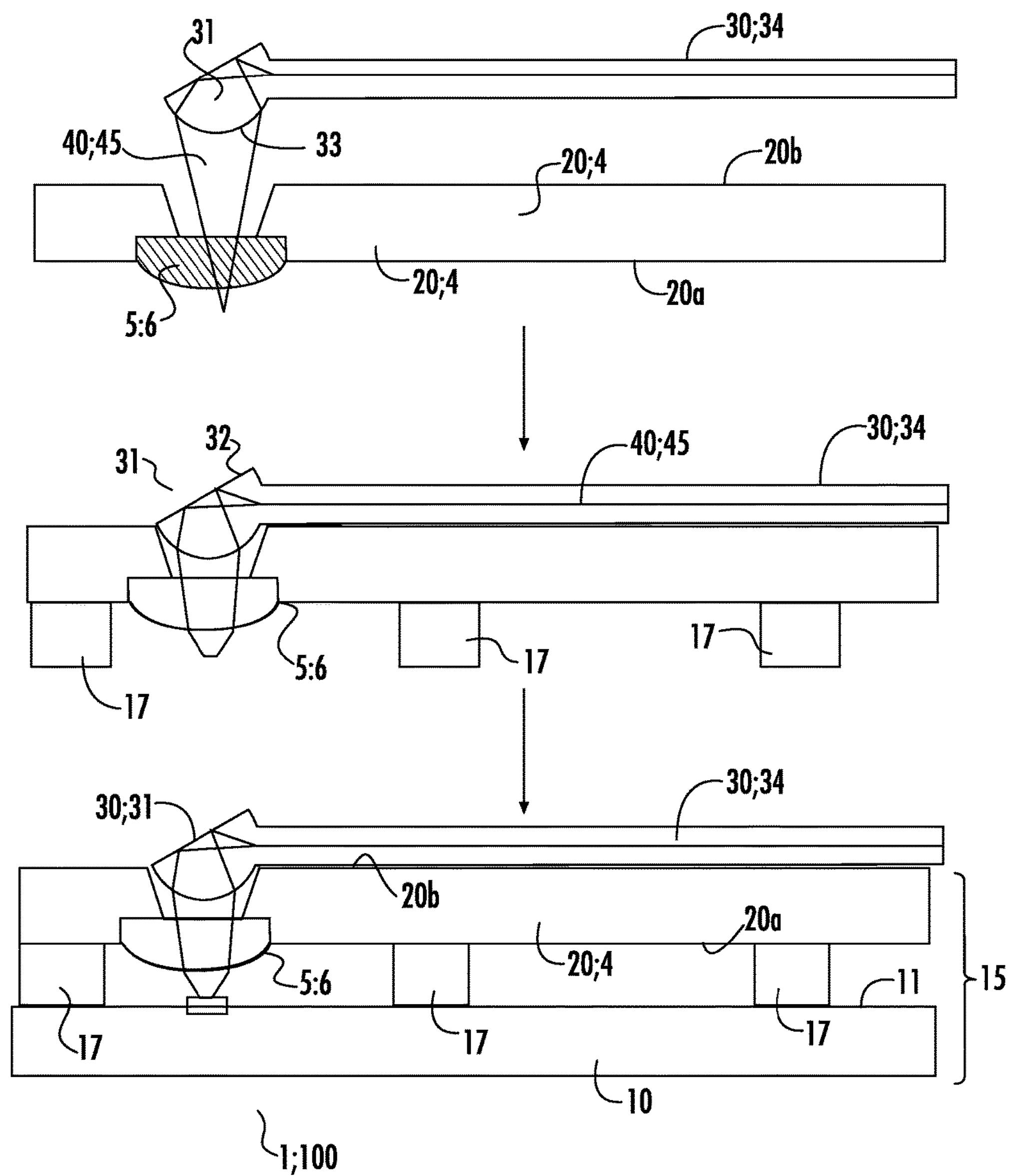
FIG. 12 shows an alternative assembling routine for a fiber coupling device having a fiber end-piece alignment substrate with a discrete lens element.

FIG. 12 shows an alternative embodiment in which a separate, discrete lens element 6 is mounted to the alignment substrate 20. Accordingly, two different materials may be used for the lens element 6 and the alignment substrate 20. Particularly, whereas the lens material 5 of the lens element 6 needs to be transparent for the radiation to be transmitted, another, second material may be chosen as the alignment substrate material 4 which may be transparent or even non-transparent for the radiation to be transmitted. Furthermore, the two materials 5, 4 may be chosen so as to optimize the manufacturing processes and techniques separately for the lens element 6 and the alignment substrate 20. In FIG. 12, the aligning element 21 initially is a through-hole but will be closed from below, when inserting or otherwise mounting the lens element 6 from the rear side to the first main surface 20*a*, so as to become a bottom surface of a recess 22. Anyway, like FIG. 11, FIG. 12 combines the benefits of proper fiber end-piece alignment with optical beam shaping by means of the lens element 6. The lens element 6 may be glued to the alignment substrate 20. For each optical fiber, a separate lens 6 may be provided. In FIGS. 11 and 12, alternatively, plano-concave, concave-convex, bi-concave or bi-convex lenses rather than plano-convex lenses may be realized, for example. In FIG. 12, spacer elements 17 as in FIG. 11 are provided between the substrates 10, 20. In this regard, the sequence of assembly steps may be chosen as in FIG. 11. The lens element or lens elements 6 are mounted to the alignment substrate 20 at the latest before both substrates 10, 20, with one of them carrying the spacer elements 17, are finally mounted to one another. According to FIG. 12, the lenses or lens elements 6 may be discrete parts or components to be mounted to the alignment substrate 20 later, rather than monolithically integrated lens surfaces 7 as in FIG. 11. However, both of them may be formed by etching of the corresponding surface 20*a* or of a piece of lens material 5, respectively.

It goes without saying that the shape of the respective aligning element 21 in any of the figures discussed above and below may be different than explicitly illustrated. In any of these embodiments, through-holes, recesses or elevated structural elements may be provided as alternative kinds of aligning elements 21.

Figure 13:
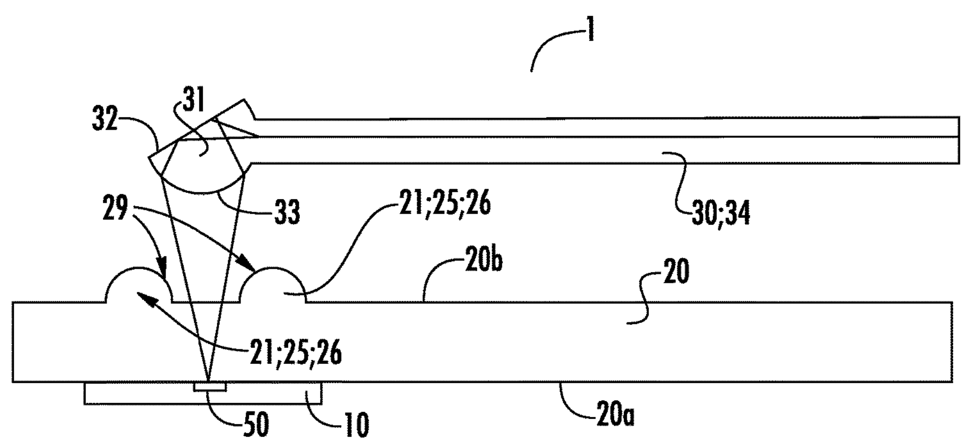
FIG. 13 shows an embodiment with at least one aligning element shaped as an elevated structural element.

FIGS. 13 to 15 show further embodiments regarding the shape of the aligning element 21 of the alignment substrate 20. According to these figures, the aligning element 21 is or at least comprises an elevated structural element 25 or a plurality, that is a set of elevated structural elements 25. According to a first embodiment, one single elevated structural element 25 laterally surrounding a center region to engage with a convex surface 33 of the fiber end-piece 31 may be provided. Alternatively, according to a second embodiment, a plurality or set of elevated structural elements 25 may be provided. The plural elevated structural elements 25 are provided at plural positions selected such that there is a center region between them destined to engage with the convex surface 33 of the fiber end-piece 31. In the first embodiment, the single elevated structural element 25, such as an annular or ring-shaped or quadratic elevated structural element, completely surrounds the surface 33 or at least a lowermost portion of it closest to the planar regions of the main surface 20*b*. Alternatively, the plural elevated structural elements of the set serve to individually and locally contact the convex surface 33 at certain spots or contact areas, i.e. supporting regions 29. Between the plural elevated structural elements, the convex surface 33 may then approach the main surface 20*b* of the alignment substrate 20 closer than according to the height of the elevated structural elements. Thus, the plural elevated structural elements 25 engage with the convex surface, i.e. exit and/or entrance surface 33 of the fiber end-piece 31, such that the convex surface, with a center portion thereof, engages between the plural elevated structural elements 25, each of which is arranged laterally outside the portion or region of the curved surface 33 closest to the main surface 20*b*. The same is likewise true for the first embodiment, however, there one single elevated structural element suffices for completely surrounding the portion of the convex surface 33 engaging with the center region surrounded by the single elevated structural element. Instead of a supporting edge 24, it may have a supporting region 29, i.e. surface region, which may be curved and may not have any edges.

Figure 14A:
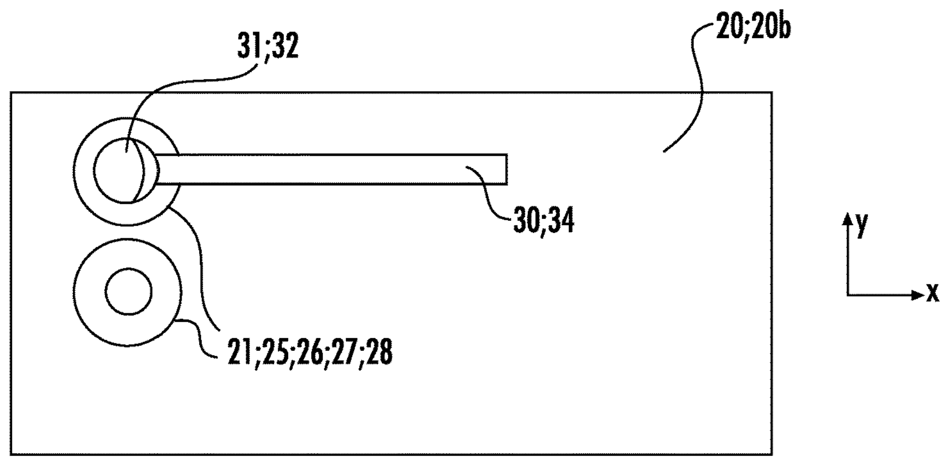
FIGS. 14A and 14B show two alternative embodiments of FIG. 13 in top view on the fiber end-piece alignment substrate.
Figure 14B:
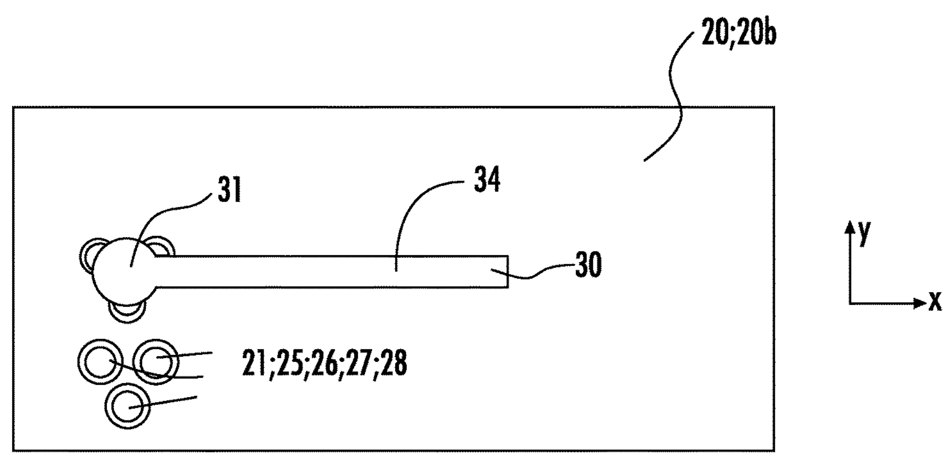

FIGS. 14A and 14B show the first and second embodiment of FIG. 13 in top view of the main surface 20*b* of the fiber end-piece alignment substrate 20 facing the fiber end-piece 31. According to FIG. 14A, one single elevated structural element 25 is depicted twice, once with and once without the fiber end-piece 31 engaging with it from the top. The convex exit and/or entrance surface 33 is not shown since it is, for the most part, facing downwards, towards the alignment substrate 20 in directions opposite to the inclined reflection surface 32 on the top of the fiber end-piece 31. According to the second embodiment of FIG. 14B, a set or plurality of, for example, three elevated structural elements 25 is provided as the fiber end-piece aligning element 21. The set of three elevated structural elements 25 is shown twice, once with and once without the fiber end-piece 31 engaged with it. Alternatively, there may be provided four, six or any other number (larger than three) of elevated structural elements 25 instead. However, three structural elements 25 may suffice.

Figure 15A:
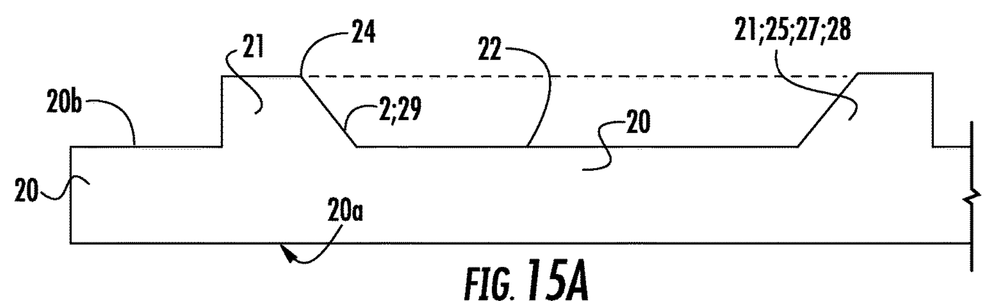
FIGS. 15A to 15C show embodiments with a fiber end-piece alignment substrate having elevated structural elements alternative to those shown in FIGS. 13 to 14B.
Figure 15B:
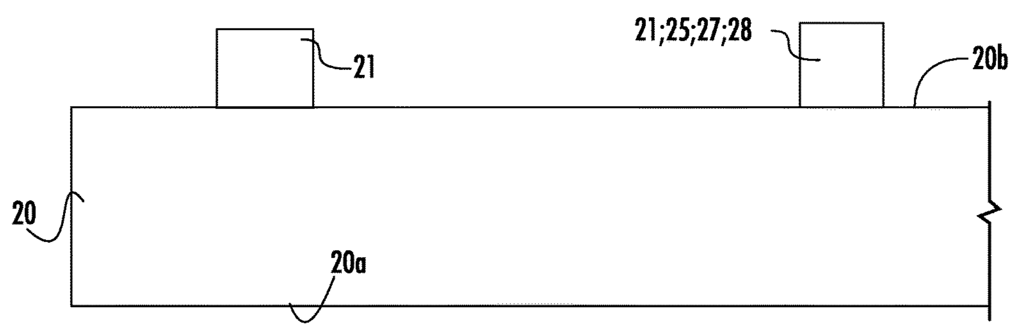
Figure 15C:
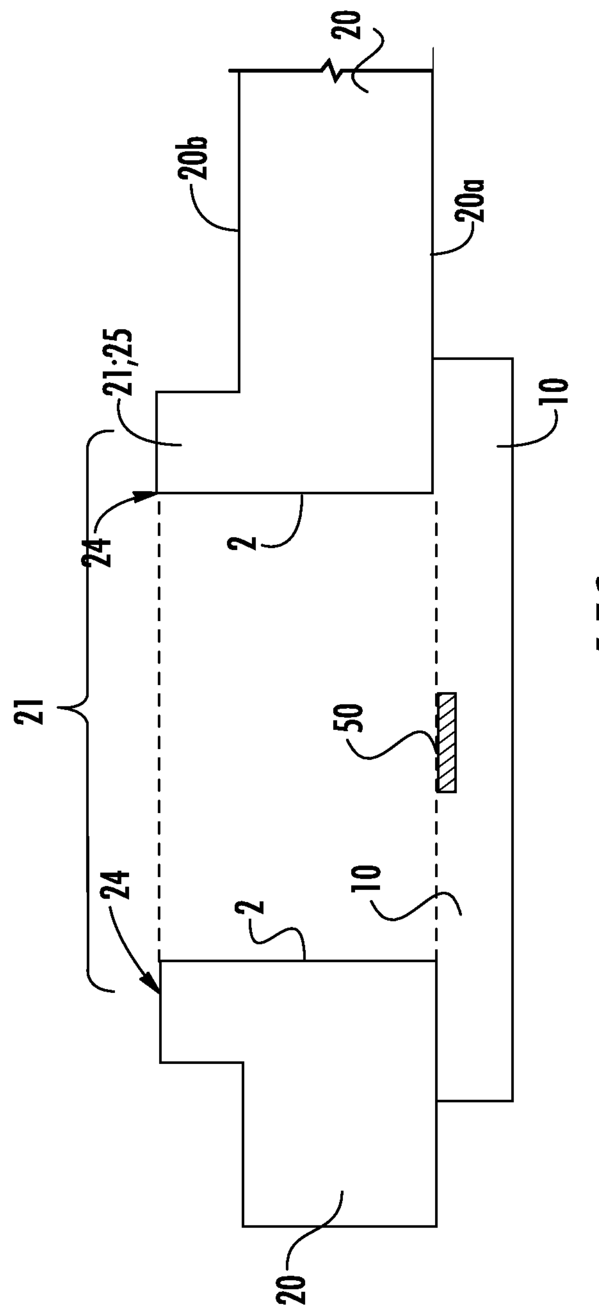

FIGS. 15A to 15C show further embodiments of elevated structural elements 25 alternative to FIGS. 13 to 14B. According to FIG. 15A, one surrounding elevated structural element or, alternatively, plural separate elevated structural elements 25 are provided as the aligning element 21 around the curved fiber end-piece surface 33. Each of FIGS. 15A to 15C may be realized according to 14A or 14B, that is with only one single elevated structural element or plural elevated structural elements. The embodiments of FIGS. 15A to 15C differ from FIG. 13 regarding the shape of the respective elevated structural elements. According to FIG. 14, a respective elevated structural element 25 may be a bump or bulge 26, having a convex but comparatively smooth surface without sharp edges or corners. Such semi-spherical or otherwise convexly shaped bulges may, for example, be produced by laser induced swelling of the material of the alignment substrate 20 at the main surface 20*b*. However, any other manufacturing technique may be applied. Each set of aligning elements 21 thus comprises three equally shaped elevated structural elements, for example bumps or bulges 26 which are arranged on a circle line and which individually protrude above the plane of the main surface 20*b*. Alternatively, in case of only one single, but ring-shaped bump or bulge 26, it likewise rises above the surrounding planar region of the main surface 20*b* so as to engage with a ring-shaped portion of the convex surface 33.

In FIGS. 15A to 15C, one single elevated structural element 25 or a set of them may be shaped so as to comprise plural surfaces having edges between them, such as vertical or tapering sidewalls on the outside and/or inside, such as conical or otherwise tapering sidewalls 2, such as depicted in FIG. 15A on the inside of the one or plural elevated structural elements 25. According to FIG. 15A or 15B, one or plural elevated structural elements 25 may be provided as ridges 27, studs 28 or otherwise shaped elements.

Referring to FIGS. 15A and 15B, the inner sidewalls of the elevation or set of elevations may be vertical or inclined, that is tapering compared to the main surface 20*b*.

Furthermore, according to FIG. 15C, the aligning element 21 may comprise a through-hole 23 or, alternatively, a recess in combination with at least one elevated structural element 21, 25, 26, 27, 28 shaped as described above, for example. In any of FIGS. 13 to 15C, the opto-electronic and/or photonic chip 10 comprising the integrated element 50 will be positioned underneath the opposite main surface 20*a* of the alignment substrate 20 in a position aligned with respect to a lateral position and/or extension of the at least one aligning element 21.

There is a general feature of all embodiments of the present application, including all embodiments of the figures, the claims and the specification which should addressed for clarification. According to the embodiments of the present application, the component 20 of the fiber coupling device 1 is a fiber end-piece alignment substrate, that is a substrate. According to the understanding addressed here, the substrate is a plate-like piece of material dimensioned appropriately to be handled and mounted separately, and large enough in its lateral directions to support another element, such as a fiber end-piece and perhaps even a section of elongate fiber portion comparatively close to the fiber end-piece. Furthermore, a substrate is an essentially planar object. However, it is thick and robust enough for being mounted and handled without breaking apart or otherwise being damaged before assembly of the fiber coupling device. Accordingly, a substrate, namely the fiber end-piece alignment substrate 20, is a component that can be produced individually before other components of the fiber coupling device, such as the opto-electronic and/or photonic substrate 10 or the optical fiber 30 or fibers are mounted to it. In particular, the fiber end-piece alignment substrate is not just a layer of material grown onto the opto-electronic and/or photonic substrate 10; neither is it a patterned structural element or plurality of patterned structural elements grown onto the opto-electronic and/or photonic substrate 10. Accordingly, whereas the aligning elements 21 of FIGS. 3 to 15C are structural elements per se which are arranged at the fiber end-piece alignment substrate 20 the alignment substrate 20 as a whole does not represent a structural element of any other substrate or on it, but a substrate per se. In particular, the fiber end-piece alignment substrate 20 may, for example, be a silicon substrate or another semiconductor substrate, a glass substrate, a metal substrate, or a dielectric substrate. Furthermore, the substrate 20 may be a multi-layer substrate comprising at least two layers of different materials. However, the term 'substrate' in the expression 'fiber end-piece alignment substrate' means that the component denoted with 20 is understood to represent a planar, flat and/or plate-like object robust and sturdy enough that is does not need any support by another object underneath it, particularly before being assembled with the further components of the fiber coupling device. In particular, the alignment substrate 20 is not a layer or patterned layer of a material grown onto the opto-electronic and/or photonic substrate, a mounting substrate or any other substrate. Rather, the component denoted with 20 is understood to represent a substrate on its own. These above remarks apply to any embodiment of the figures, the claims and the specification of the present application.

Figure 16:
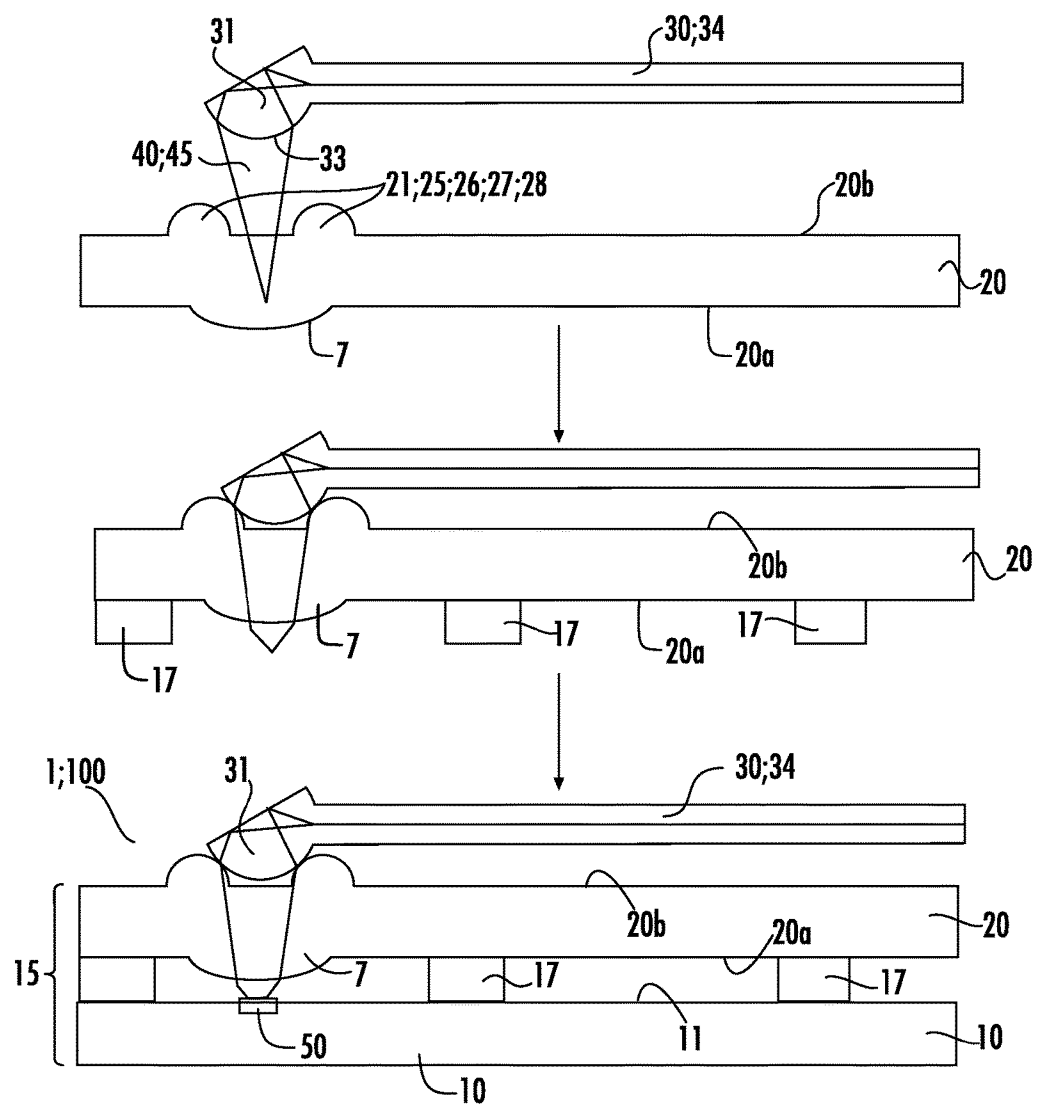
FIG. 16 shows a routine for assembling a fiber coupling device having elevated structural elements and a lens surface on opposite main surfaces of the fiber end-piece alignment substrate.

FIG. 16 shows an exemplary embodiment in which elevated structural elements 25, such as those depicted in FIGS. 13 to 14B, or, alternatively, FIGS. 15A to 15C, are disposed on a fiber end-piece alignment substrate 20 having a lens surface 7 on its opposite main surface 20*a*. Regarding the spacer elements 17, please see the above comments on FIG. 11 or 12. It is to be noted that any of the embodiments of FIGS. 3A to 16 may be combined with any other embodiment of FIGS. 3A to 16. Furthermore, any embodiment or combination of embodiments may be realized, with either one single optical fiber or, alternatively, a plurality of optical fibers.

Figure 17:
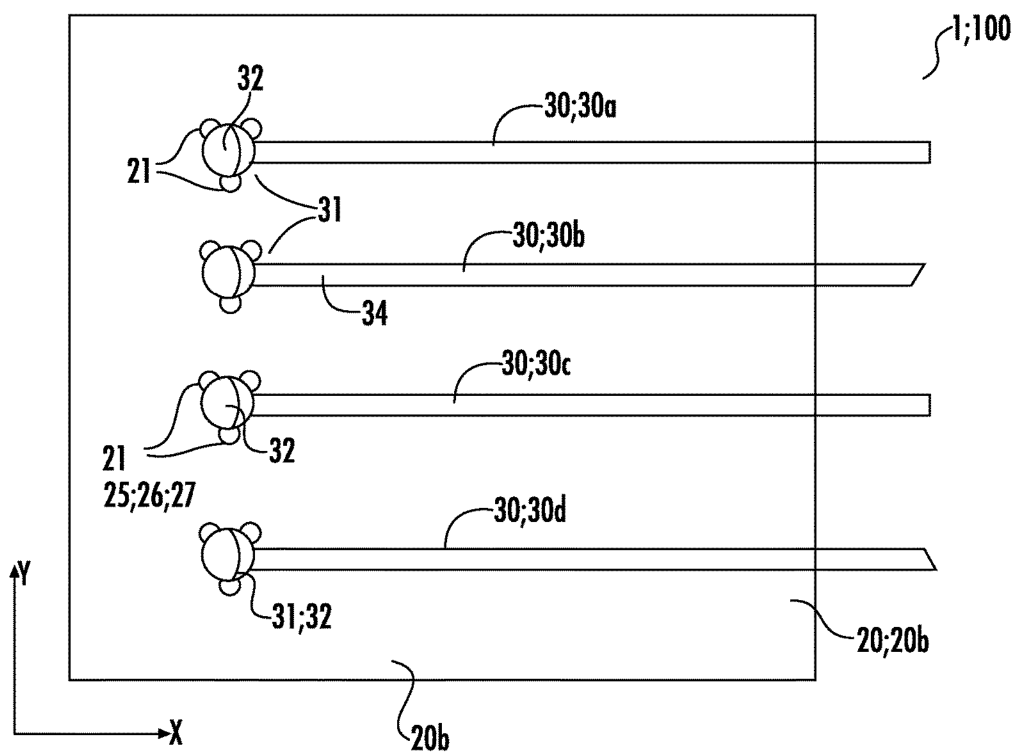
FIGS. 17 and 18 show top views on the main surfaces of a fiber end-piece alignment substrate of a fiber coupling device connected to four fiber end-pieces.
Figure 18:
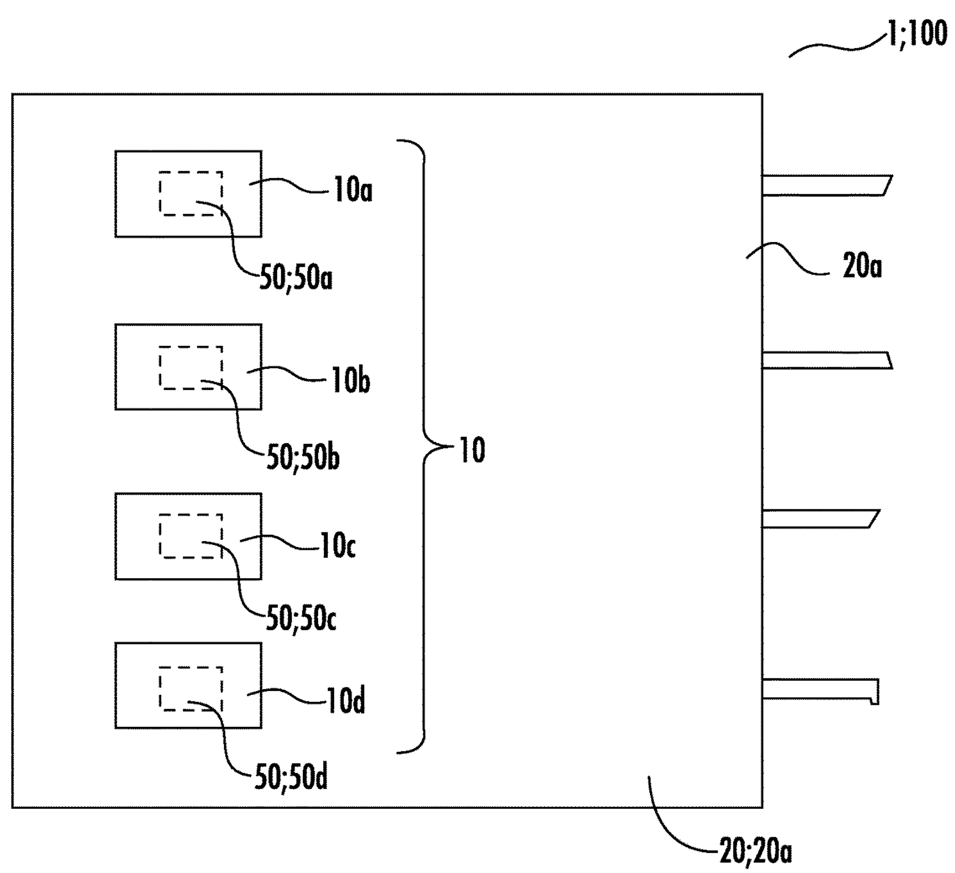

FIGS. 17 and 18 schematically show top views on the top and bottom main surfaces 20*b*, 20*a* of a fiber end-piece alignment substrate 20 of an exemplary fiber coupling device 1 comprising a plurality of, for example, four optical fibers with fiber end-pieces coupled to it. FIG. 17 shows the top view on the upper, second main surface 20*b* of the fiber end-piece alignment substrate 20 facing the fiber end-pieces 31, whereas FIG. 18 shows, from below, the lower, first main surface 20*a* where the opto-electronic and/or photonic chips 10; 10*a*, . . . , 10*d* are mounted. The opto-electronic and/or photonic elements 50, such as photo diodes, VCSELs or others, actually are not visible from below since they are facing the alignment substrate 20. Instead of a plurality of chips 10; 10*a*, . . . , 10*d* each comprising one single opto-electronic and/or photonic element 50, also one single chip comprising all integrated elements 50; 50*a*, . . . , 50*d* may be provided instead. Accordingly, a single chip 10 comprising all integrated elements of the fiber coupling device 1 may be provided, thereby reducing manufacturing efforts and costs.

In a region between the respective integrated element 50 and the respective fiber end-piece 31 to be coupled to it, the fiber end-piece alignment substrate 20 comprises at least one respective fiber end-piece aligning element 21 such as one or some of the elevated structural elements 25, 26, 27, 28 addressed above and/or recess 22, through-hole 23 or any other kind of aligning element 21 or set of aligning elements 21. Also in case of a structural element which is elevated, there is a supporting edge and/or a supporting region where the alignment substrate 20 locally contacts and thereby supports the respective fiber end-piece 31. In these contact areas 24 and/or 29, an adhesive or a glue material may be provided in-between or closely nearby.

Whereas in FIG. 17 for the respective fiber end-piece 31 a set of three respective aligning elements 21 is indicated, any other embodiment of aligning element 21 or set of aligning elements 21 may be realized as well. Particularly, any of the embodiments of the claims, figures and the specification may be realized as a fiber coupling device 1 comprising four or another number of fiber end-pieces so as to represent a fiber coupling arrangement 100, or at least a fiber coupling device 1 configured for mounting of a plurality fiber end-pieces of optical fibers 30; 30*a*, 30*b*, 30*c*, 30*d* to it. Whereas the fiber coupling device 1 per se, as a vendable product even before mounting of any optical fiber to it, need not comprise any optical fiber or end-piece of it, at the latest when one or plural fiber end-pieces will be mounted to it, a fiber device arrangement 100 is completed which also includes the at least one fiber end-piece and/or optical fiber. The plurality of fibers, especially their elongate fiber portions 34, may be connected so as to form a multi-fiber ribbon, which is more easily applicable to the main surface 20*b* of the fiber end-piece alignment substrate 20.

Figure 19:
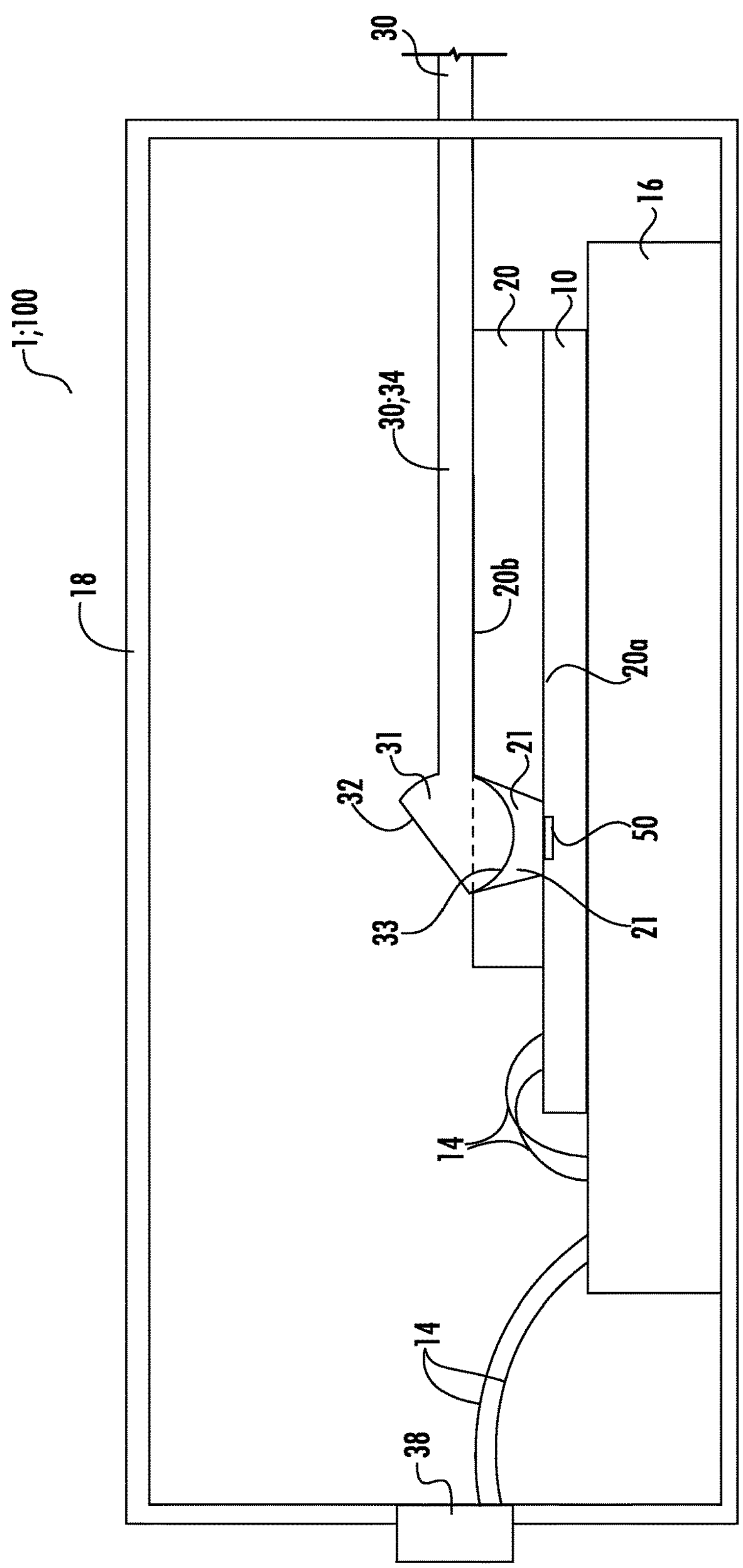
FIG. 19 schematically shows an embodiment of a fiber coupling device in cross-sectional view.

FIG. 19 schematically shows an embodiment of a fiber coupling device 1 in cross-sectional view. In addition to those components already explained above, the fiber coupling device 1 may further comprise a mounting substrate 16 on which the opto-electronic and/or photonic chip 10 and/or the fiber end-piece alignment substrate 20 is mounted. However, the opto-electronic and/or photonic chip 10 and the fiber end-pieces 31 are arranged at two opposite sides of the fiber end-piece alignment substrate 20. The opto-electronic and/or photonic chip 10 may be connected to the mounting substrate 16 by means of electrical conductor lines, such as wires. The mounting substrate may be a printed circuit board. The fiber coupling device 1 may further comprise a housing 18. The mounting substrate 16 may be connected to an electrical interface 38 by means of further electrical conductor lines 14.

Also in any other figure, claim or embodiment of the application, the fiber coupling device may further comprise a mounting substrate 16, such as a PCB, and/or the housing. The housing and/or the electrical interface 38 may form a plug pluggable to any other plug or device, such as a computer, a mainboard, a server or to a component or interface thereof. For example, the fiber coupling device 1 may be a mid-board connector for a server. Alternatively, the fiber coupling device 1 may be a connector plug of an active optical cable, for example. Furthermore, the fiber coupling device 1 can be any other device comprising at least one opto-electronic and/or photonic chip 10 with at least one opto-electronic and/or photonic chip 50 coupled or to be coupled to a respective optical fiber.

Figure 20:
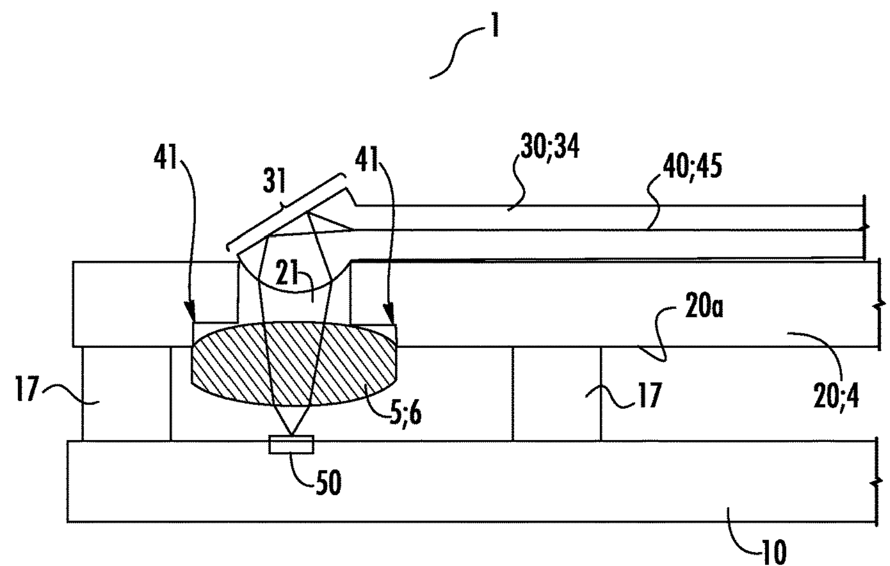
FIG. 20 shows an embodiment of a fiber coupling device having a bi-convex lens element.

FIG. 20 shows another alternative embodiment of a fiber coupling device 1 having a discrete lens element 6 of a lens material 5. In contrast to FIG. 12, the lens element, i.e. lens 6, is a bi-convex lens. In addition to the fiber end-piece aligning element 21, further a lens aligning element may be provided in the alignment substrate 20, close to the first main surface 20*a*. Along the perimeter of the lens 6 or of the lens aligning element, one or plural voids 41 may be provided which may be filled with glue or another adhesive material.

Figure 21:
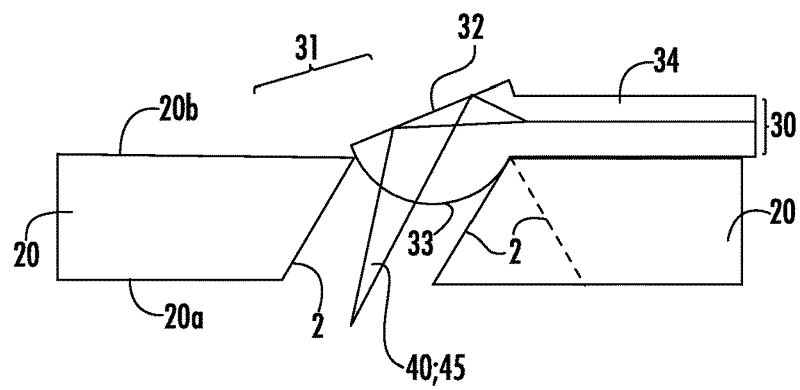
FIG. 21 shows an embodiment of a fiber end-piece alignment substrate configured for engagement with a fiber end-piece with a reflection surface having an orientation other than diagonally to the substrate.

FIG. 21 shows an embodiment of an alignment substrate 20 configured for engagement with a fiber end-piece 31 having a reflection surface 32 that is oriented at an angle other than 45° relative to the main surfaces 20*a*, 20*b*. Accordingly, the beam 45 of radiation 40 need not propagate along the normal direction of the main surfaces 20*a*, 20*b* when travelling between the opto-electronic or photonic element and the fiber end-piece 31. Instead, the beam of radiation may have a propagation direction inclined to the normal direction of the alignment substrate 20. The sidewalls 2 of the recess 23 or fiber end-piece aligning element 21 may be parallel to the inclined propagation direction. Alternatively, as indicated by the dashed line indicating a different orientation of the right sidewall 2 or sidewall portion, the perimeter of the recess 23 or fiber end-piece aligning element 21 may be shaped cylindrical, conical or otherwise symmetric around the normal direction of the alignment substrate 20.

Figure 22:
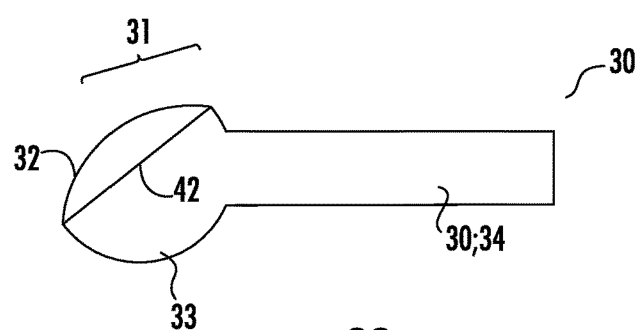
FIG. 22 shows an alternative fiber end-piece couplable to fiber coupling devices of embodiments of the application.

FIG. 22 shows an embodiment of a fiber end-piece which is also couplable to the fiber coupling devices of the embodiments of the application. According to FIG. 22, the fiber end-piece 31 may comprise a reflection surface 32 which is different from a cleaved surface 42 where the ball-like end-piece portion is cut through. Instead, on the cleaved surface 42, a further material may be applied and/or may be treated, for example polished. Thereby, the outer, exposed surface of the further material, such as a deposit material, is obtained as the reflection surface 32. The reflection surface 32 may be planar or curved, as shown, so as to represent a lens surface for internal reflection, such as total internal reflection, for example.

The invention claimed is:

1. A fiber coupling device for coupling of at least one optical fiber, wherein the fiber coupling device comprises at least one opto-electronic and/or photonic chip comprising at least one opto-electronic and/or photonic integrated element capable of emitting and/or detecting electromagnetic radiation;

wherein the fiber coupling device is configured for coupling the at least one opto-electronic and/or photonic integrated element to at least one fiber end-piece of an optical fiber having a reflection surface and a convex exit and/or entrance surface;

wherein the fiber coupling device further comprises a fiber end-piece alignment substrate configured for locally contacting and thereby supporting at least one convex exit and/or entrance surface of at least one fiber end-piece in an aligned position relative to the at least one opto-electronic and/or photonic integrated element;

wherein the fiber end-piece alignment substrate comprises a first main surface and a second main surface opposite to the first main surface;

wherein the fiber end-piece alignment substrate comprises at least one fiber end-piece aligning element configured for engagement with a convex exit and/or entrance surface of at least one fiber end-piece;

wherein the fiber end-piece alignment substrate comprises at least one through-hole reaching from the second main surface to the first main surface, the at least one through-hole on the second main surface being configured to at least locally contact and/or engage with a convex exit and/or entrance surface of a fiber end-piece of a respective optical fiber; and wherein the fiber coupling device further comprises a lens mounted to the first main surface and configured to cover the through-hole.

2. The fiber coupling device of claim 1, wherein the fiber end-piece alignment substrate is an intermediate substrate interposed or destined to be interposed between the at least one opto-electronic and/or photonic chip and at least one fiber end-piece of at least one optical fiber.

3. The fiber coupling device of claim 1,
wherein the at least one opto-electronic and/or photonic chip is mounted on a first side of the fiber end-piece alignment substrate; and
wherein the fiber end-piece alignment substrate is configured for locally contacting and thereby supporting, in an aligned position relative to the at least one opto-electronic and/or photonic integrated element, a convex exit and/or entrance surface of at least one fiber end-piece arranged on an opposite side of the fiber end-piece alignment substrate.

4. The fiber coupling device of claim 1,
wherein the at least one opto-electronic and/or photonic chip is mounted at or near the first main surface; and
wherein the second main surface of the fiber end-piece alignment substrate is shaped so as to locally contact and thereby support, in an aligned position relative to the at least one opto-electronic and/or photonic integrated element, a convex exit and/or entrance surface of at least one fiber end-piece.

5. The fiber coupling device of claim 4,
wherein the fiber end-piece alignment substrate is a plane parallel plate or another plate-like object interposed be-tween a plurality of opto-electronic and/or photonic chips and a plurality of optical fibers,
wherein each opto-electronic and/or photonic chip is individually mounted to the first main surface of the fiber end-piece alignment substrate at a lateral position corresponding to a lateral position of a respective fiber end-piece aligning element associated with a respective optical fiber or corresponding to lateral positions of a respective plurality of fiber end-piece aligning elements associated with a respective plurality of optical fibers.

6. The fiber coupling device of claim 4,
wherein the fiber end-piece alignment substrate comprises alignment marks arranged on its first main surface, the alignment marks for aligned chip mounting of each opto-electronic and/or photonic chip in a lateral position corresponding to the lateral position of a respective fiber end-piece aligning element associated with a respective optical fiber.

7. The fiber coupling device of claim 1,
wherein the fiber end-piece alignment substrate is a semi-conductor substrate, a glass substrate, a metal substrate or a dielectric substrate and wherein the at least one opto-electronic and/or photonic chip is mounted on one side of and/or at one main surface of the fiber end-piece alignment substrate.

8. The fiber coupling device of claim 1,
wherein the fiber end-piece alignment substrate is a carrier substrate for holding, on its opposite main surfaces, the at least one opto-electronic and/or photonic chip and at least one fiber end-piece in aligned positions relative to one another.

9. The fiber coupling device of claim 1,
wherein the fiber end-piece alignment substrate and/or a second main surface thereof is configured for locally contacting and supporting both a convex exit and/or entrance surface of at least one fiber end-piece and at least a portion of a circumferential fiber surface of an elongate fiber section of at least one optical fiber.

10. The fiber coupling device of claim 1,
wherein the fiber end-piece aligning element comprises a circular, polygonal or otherwise shaped supporting edge destined for locally contacting and supporting a convex exit and/or entrance surface of a respective fiber end-piece.

11. The fiber coupling device of claim 1,
wherein the through-hole comprises sidewalls that are tapered relative to a normal direction of the fiber end-piece alignment substrate.

12. The fiber coupling device of claim 1,
wherein each opto-electronic and/or photonic chip of the fiber coupling device is mounted at or near the first mounting surface of the fiber end-piece alignment substrate such that the opto-electronic and/or photonic integrated element is arranged, in lateral directions, in a centered and/or aligned position relative to the through-hole or other kind of fiber end-piece aligning element.

13. The fiber coupling device of claim 1,
wherein the at least one opto-electronic and/or photonic chip is mounted to the first main surface of the fiber end-piece alignment substrate in a position aligned with the fiber end-piece aligning element.

14. The fiber coupling device of claim 1,
wherein the fiber coupling device comprises at least one spacer element for providing a distance, along the normal direction of the fiber end-piece alignment substrate, between the fiber end-piece alignment substrate and the at least one opto-electronic and/or photonic chip, wherein the at least one spacer element extends between the first main surface of the fiber end-piece alignment substrate and a main surface of the at least one opto-electronic and/or photonic chip.

15. The fiber coupling device of claim 1,
wherein the fiber end-piece aligning element comprises a supporting edge and/or at least one supporting region for locally contacting a convex exit and/or entrance surface of a respective fiber end-piece.

16. The fiber coupling device of claim 1,
wherein the fiber end-piece alignment substrate and the at least one opto-electronic and/or photonic chip are bonded to one another so as to form a composite substrate ready for passive alignment of at least one fiber end-piece of at least one optical fiber to the at least one opto-electronic and/or photonic integrated element.

17. The fiber coupling device of claim 1,
wherein the fiber coupling device further comprises a mounting substrate to which the at least one opto-electronic and/or photonic chip and/or the fiber end-piece alignment substrate is mounted.

18. The fiber coupling device of claim 1,
wherein the fiber coupling device is configured for mounting at least one optical fiber, with its fiber end-piece as well as with its elongate fiber portion, to the fiber end-piece alignment substrate without contacting the at least one opto-electronic and/or photonic chip directly.

19. The fiber coupling device of claim 1,
wherein the fiber coupling device comprises at least one optical fiber comprising a thickened fiber end-piece having an inclined reflection surface and a convex exit and/or entrance surface, wherein each optical fiber is supported by and/or engaged with the fiber end-piece alignment substrate.

20. The fiber coupling device of claim 19,
wherein the convex exit and/or entrance surface of each optical fiber is supported by the fiber end-piece alignment substrate by means of at least one respective fiber end-piece aligning element, such as a recess, a through-hole or an elevated structural element.

21. The fiber coupling device of claim 1, wherein the convex exit and/or entrance surface of each respective optical fiber is locally contacted by at least one respective fiber end-piece aligning element of the fiber end-piece alignment substrate.

22. The fiber coupling device of claim 1, wherein a plurality of opto-electronic and/or photonic chips is mounted to the fiber end-piece alignment substrate, the fiber end-piece alignment substrate bridging over gaps between the opto-electronic and/or photonic chips of the plurality of opto-electronic and/or photonic chips.

23. The fiber coupling device of claim 1, wherein the fiber end-piece alignment substrate includes one or plural voids in the first main surface, and the lens is mounted to the one or plural voids.

24. A fiber coupling device for coupling a plurality of optical fibers, wherein the fiber coupling device comprises:

a plurality of opto-electronic and/or photonic chips each having an opto-electronic and/or photonic integrated element capable of emitting and/or detecting electromagnetic radiation;

a plurality of fiber end-pieces of optical fibers or for being connected to optical fibers, each fiber end-piece having a thickened end-piece portion and a cylindrical fiber portion laterally protruding from the thickened end-piece portion, wherein each thickened end-piece portion comprises a reflection surface and a convex exit and/or entrance surface configured for being coupled to the opto-electronic and/or photonic integrated elements; and a fiber end-piece alignment substrate configured for locally contacting and thereby supporting the exit and/or entrance surfaces of the fiber end-pieces in an aligned position relative to the opto-electronic and/or photonic integrated elements, wherein the fiber end-piece alignment substrate comprises a first main surface and a second main surface opposite to the first main surface;

wherein the fiber end-piece alignment substrate comprises at least one fiber end-piece aligning element configured for engagement with a convex exit and/or entrance surface of at least one fiber end-piece;

wherein the fiber end-piece alignment substrate comprises at least one through-hole reaching from the second main surface to the first main surface, the at least one through-hole being configured to at least locally contact and/or engage with a convex exit and/or entrance surface of a fiber end-piece of a respective optical fiber; and wherein the fiber coupling device further comprises a lens mounted to the first main surface and configured to cover the through-hole.

25. The fiber coupling device of claim 24, wherein the opto-electronic and/or photonic chips are mounted at or on the side of a first main surface of the fiber end-piece alignment substrate, whereas the fiber end-pieces are mounted at or on the side of an opposite, second main surface of the fiber end-piece alignment substrate.

26. The fiber coupling device of claim 24, wherein the fiber end-piece alignment substrate comprises a plurality of fiber end-piece aligning elements engaging with the convex exit and/or entrance surfaces of the fiber end-pieces so as to support the fiber end-pieces in positions aligned relative to the opto-electronic and/or photonic integrated elements.

27. The fiber coupling device of claim 26, wherein each fiber end-piece aligning element comprises a supporting area, such as a supporting edge and/or a supporting region, which abuts a respective convex exit and/or entrance surface of an associated fiber end-piece.

28. A fiber coupling device comprising:

a fiber end-piece alignment substrate having a first main surface, a second main surface opposite to the first main surface and at least one fiber end-piece aligning element;

at least one opto-electronic and/or photonic chip arranged at or near the first main surface in a position aligned relative to a respective fiber end-piece aligning element and comprising a respective opto-electronic and/or photonic integrated element; and at least one fiber end-piece having a reflection surface and a convex exit and/or entrance surface, the convex exit and/or entrance surfaces being supported by and/or engaged with a respective fiber end-piece aligning element of the fiber end-piece alignment substrate, wherein the at least one fiber end-piece aligning element is configured for engagement with the convex exit and/or entrance surface of the at least one fiber end-piece; and wherein the fiber end-piece aligning element includes at least one elevated structural element protruding above the second main surface of the fiber end-piece alignment substrate and being configured for locally contacting a convex exit and/or entrance surface of a respective fiber end-piece, and the at least one elevated structural element has a curved supporting region.

29. The fiber coupling device of claim 28, wherein each convex exit and/or entrance surface comprises a first surface portion arranged above the second main surface and a second surface portion being surrounded, abutted and/or supported by an associated fiber end-piece aligning element, by an associated support edge and/or by an associated support region.

30. The fiber coupling device of claim 28, wherein at least a portion of the convex exit and/or entrance surface is arranged closer to the second main surface, along the normal direction of the second main surface, than the height of the associated fiber end-piece aligning element.

31. The fiber coupling device of claim 28, wherein each fiber end-piece aligning element includes a recess or a through-hole provided in the fiber end-piece alignment substrate and extending towards an associated opto-electronic and/or photonic integrated element which is arranged, at or beneath the first main surface, in an aligned position relative to the recess or through-hole along lateral directions.

32. The fiber coupling device of claim 28, wherein the at least one elevated structural element is a ridge, a stud, or a bump above the second main surface of the fiber end-piece alignment substrate.

33. The fiber coupling device of claim 28, wherein the at least one elevated structural element comprises, for each optical fiber to be coupled, a respective set of plural ridges, studs, or bumps arranged so as to symmetrically surround at least a portion of a respective convex exit and/or entrance surface of a respective fiber end-piece.

34. A fiber coupling device comprising:

a plurality of opto-electronic and/or photonic integrated elements comprised in one opto-electronic and/or photonic chip or in plural opto-electronic and/or photonic chips, one fiber end-piece alignment substrate;

a plurality of fiber end-pieces; and plural elevated structural elements laterally surrounding, individually or in groups, at least a portion of a convexly shaped radiation beam exit and/or entrance surface of fiber end-pieces associated to them, wherein the fiber end-piece alignment substrate comprises a first main surface and a second main surface opposite to the first main surface;

wherein the one opto-electronic and/or photonic chip is mounted at or near the first main surface; and wherein the plural elevated structural elements extend, above the second main surface of the fiber end-piece alignment substrate, to a height which is larger than a respective smallest distance between the surrounded portion of the associated, convexly shaped radiation beam exit and/or entrance surface and the second main surface, and each of the plural elevated structural elements has a curved supporting region.

35. The fiber coupling device of claim 34, wherein the at least one elevated structural element is a ridge, a stud, or a bump protruding above the second main surface of the fiber end-piece alignment substrate.

36. The fiber coupling device of claim 34, wherein the at least one elevated structural element comprises, for each optical fiber to be coupled, a respective set of plural ridges, studs, or bumps arranged so as to symmetrically surround at least a portion of a respective convex exit and/or entrance surface of a respective fiber end-piece.

* * * * *

UNITED STATES PATENT AND TRADEMARK OFFICE

CERTIFICATE OF CORRECTION

PATENT NO. : 10,048,454 B2
APPLICATION NO. : 15/239986
DATED : August 14, 2018
INVENTOR(S) : Christian Fiebig et al.

It is certified that error appears in the above-identified patent and that said Letters Patent is hereby corrected as shown below:

On the Title Page

In Column 1, item (71), Applicant, Lines 1-2, delete "CCS Technology, Inc., Wilmington (DE)" and insert -- Corning Optical Communications LLC, Hickory, NC (US) --, therefor.

In the Claims

In Column 23, Line 25, Claim 5, delete "be-tween" and insert -- between --, therefor.

Signed and Sealed this
Twenty-sixth Day of May, 2020

Andrei Iancu
*Director of the United States Patent and Trademark Office*